(12) United States Patent
Daios et al.

(10) Patent No.: US 12,317,782 B2
(45) Date of Patent: Jun. 3, 2025

(54) ELONGATED SHEET FOR COVERING AGRICULTURAL CULTIVATED PLANTS

(71) Applicant: Asterios Daios, Naoussa (GR)

(72) Inventors: Asterios Daios, Naoussa (GR); Dimitrios Daios, Salonika (GR)

(73) Assignee: Asterios Daios, Naoussa (GR)

( * ) Notice: Subject to any disclaimer, the term of this patent is extended or adjusted under 35 U.S.C. 154(b) by 66 days.

(21) Appl. No.: 17/860,510

(22) Filed: Jul. 8, 2022

(65) Prior Publication Data
US 2023/0148407 A1 May 11, 2023

(30) Foreign Application Priority Data
Nov. 8, 2021 (EP) .................................... 21206952

(51) Int. Cl.
*A01G 13/21* (2025.01)
(52) U.S. Cl.
CPC .................................... *A01G 13/21* (2025.01)
(58) Field of Classification Search
CPC ............... A01G 13/0206; A01G 13/02; A01G 13/0231; A01G 13/04; A01G 13/0225;
(Continued)

(56) References Cited

U.S. PATENT DOCUMENTS 3,276,943 A * 10/1966 Kawamura ............. B32B 27/00
264/173.1
3,698,131 A * 10/1972 Kesinger ................ A01G 9/242
47/29.1

(Continued)

FOREIGN PATENT DOCUMENTS

EP 0448714 A1 * 10/1991 ........... A01G 9/1438
EP 3172961 A1 5/2017
(Continued)

OTHER PUBLICATIONS

Sanchez; Signs of Heat Stress in Plants, Jun. 29, 2021; https://www.klamathfallsnews.org/news/signs-of-heat-stress-in-plants (Year: 2021).*
(Continued)

*Primary Examiner* — Joshua J Michener
*Assistant Examiner* — Nicole Paige Maccrate
(74) *Attorney, Agent, or Firm* — Jason H. Vick; Amped IP LLC

(57) ABSTRACT

The present invention relates to an elongated sheet (1) for covering agricultural cultivated plants (2) for generating a greenhouse climate in the covered area, having an elongated basic film (3) made of plastic, wherein a ventilation area (5) extending in the longitudinal direction (L) of the sheet is provided in the central area of the basic film (4) and having a plurality of ventilation openings (6), wherein a cover film (9) of plastic extending in longitudinal sheet direction (L) of the basic film (3) is applied to the ventilation area (5) forming free spaces (11) for air exchange and is firmly welded to the basic film (3) via a plurality of connection areas (10) following one another in longitudinal sheet direction (L). In accordance with the invention, it is provided that the material and/or the quality of the cover film (9) is selected in such a manner that the cover film (9), in a first state, lies flat against and/or on the upper side of the basic film (3) at least substantially in the region of the free spaces (11) and, preferably by convection of the heated air in the covered area, in a second state at least partially lifts off relative to the upper side of the basic film (3) forming free spaces (11), wherein the first state is maintained up to a transition temperature $T_1$ of the greenhouse climate and wherein the second state is obtained and/or realized from the transition temperature $T_1$ of the greenhouse climate.

17 Claims, 18 Drawing Sheets

(58) Field of Classification Search
CPC . A01G 2013/006; A01G 9/1438; Y02A 40/25
See application file for complete search history.

(56) References Cited

U.S. PATENT DOCUMENTS

| | | | | |
|---|---|---|---|---|
| 4,005,547 | A | * 2/1977 | Caldwell | A01G 13/04 47/29.1 |
| 4,285,162 | A | * 8/1981 | Hilton | A01G 9/1438 47/29.1 |
| 4,387,533 | A | * 6/1983 | Green | A01G 9/22 52/63 |
| 2015/0201565 | A1 | 7/2015 | Toye | |

FOREIGN PATENT DOCUMENTS

| | | | | |
|---|---|---|---|---|
| GR | 1004440 B | 2/2004 | | |
| WO | WO-2007128019 A1 | * 11/2007 | | A01G 13/0275 |

OTHER PUBLICATIONS

European Search Report for corresponding European Application No. 21206952.0, mailed Apr. 7, 2022.

* cited by examiner

ELONGATED SHEET FOR COVERING AGRICULTURAL CULTIVATED PLANTS

CROSS-REFERENCE TO RELATED APPLICATIONS

This application claims the benefit under 35 U.S.C. 119(a) to European Patent Application No. 21 206 952.0, filed 8 Nov. 2021, the disclosure of which is incorporated herein by reference in its entirety.

The present invention relates to an elongated sheet for covering agricultural cultivated plants, for example vegetable and/or fruit plants or herbs. The cover comprises an elongated basic film made of plastic.

Elongated sheets of the aforementioned type are known from practice and are in particular placed on supporting posts, a frame or rack and can be fixed with ropes (or tension ropes) or otherwise.

The elongated sheet can configure a gable roof for the cultivated plants underneath. In principle, it is also known to use the elongated sheet for greenhouses. In particular, the elongated sheet can be used in foil tunnels. Foil tunnels may comprise a framework, which is usually made of steel. This framework can in particular have round arches or metal tubes bent in a semicircle, on which the sheet can then be laid. Finally, foil tunnels can comprise connecting rods and a tunnel-shaped framework that can be covered with the sheet. The foil or elongated sheet is secured to the ground and/or the framework in particular to prevent wind blowing. In this case, the elongated sheet can extend to the ground or a distance to the ground can be provided, in particular if the sheet is attached to the framework.

Prior art foil tunnels or greenhouses may comprise openings, such as doors or the like, which can be closed as required. For example, a foil tunnel may be configured to be open or closed at the front sides. Foils or the elongated sheet itself can also be used to close the foil tunnel.

Ultimately, in particular when used to cover a greenhouse and/or foil tunnel, the sheet is used to take advantage of the greenhouse effect. This is based on the fact that due to the in particular translucent cover and/or sheet, an area protected from the weather can be created for the cultivated plants. The area or greenhouse climate can also be configured in such a way that there is an increase in temperature and humidity compared to the weather conditions outside the greenhouse.

However, it has been found in practice that in particular strongly heated and/or very humid air accumulates underneath the cover film—i.e. in the covered area-due to the covering of the cultivated plants. This air should more preferably be able to escape from the covered area for optimum growth of the cultivated plants. At the same time, a supply of fresh air to ventilate the covered area is useful, especially of air of lower temperatures as well as lower saturation, to facilitate the growth of cultivated plants.

To solve the aforementioned problem, it is known in the prior art to configure a ventilation area on the sheet, which can be configured to ventilate and/or deaerate the covered area. The ventilation area can comprise a plurality of ventilation openings that can ensure air exchange.

To prevent rain from penetrating through the ventilation openings into the area of the cultivated plants and/or the covered area, it is also known to cover the ventilation openings. However, in the case of the covering of the ventilation opening known from the prior art, it has been found to be disadvantageous that the air exchange is insufficient, which in turn is disadvantageous for the cultivated plants and in particular their growth. Ultimately, no ventilation system adapted to the conditions of the crop plants necessary for good growth can be provided in the prior art.

The object of the present invention is to remedy this situation.

According to the invention, the aforementioned object is at least substantially solved by an elongated sheet for covering agricultural crops, in particular for a greenhouse, for generating a greenhouse climate, which can also be referred to as subclimate and/or greenhouse climate, in the covered area, wherein the elongated sheet comprises an elongated basic film made of plastic. Furthermore, a ventilation area extending in longitudinal sheet direction and having a plurality of ventilation openings is provided in the central area of the basic film. A cover film made of plastic, in particular an elongated one, extending in the longitudinal sheet direction of the basic film, is applied to the ventilation area to produce free spaces for air exchange and is firmly welded to the basic film via a plurality of connection areas following one another in the longitudinal sheet direction. The cover film serves in particular to cover the ventilation openings, more preferably completely.

According to the invention, it is provided that, in accordance with a first inventive alternative, the material and/or the nature and/or the quality of the cover film is selected in such a way that the cover film, in particular in the state of use, in a first state lies flat against or on the upper side of the construction film at least substantially in the region of the free spaces and, preferably by convection of the heated air in the covered region, in a second state lifts off at least in regions relative to the upper side of the basic film forming free spaces between the upper side of the basic film and the underside of the cover film, wherein the first state is maintained up to a transition temperature $T_1$ of the greenhouse climate and wherein the second state is obtained and/or realized above the transition temperature $T_1$ of the greenhouse climate.

Finally, the cover film is in contact with the upper side of the basic film up to the transition temperature $T_1$, wherein at a temperature T in the covered region above the transition temperature $T_1$ the cover film lifts off relative to the upper side of the basic film with production of free spaces at least in some regions.

According to the second inventive alternative, which can preferably also be combined with the first alternative according to the invention, it is provided that the cover film and/or the material of the cover film is configured to be more elastic and/or softer and/or less rigid than the basic film and/or the material of the basic film and/or that the cover film comprises a lower grammage than the basic film.

In both alternatives according to the invention, the outstanding advantage is that, according to the invention, a self-regulating system can be ensured with regard to the air ventilation in the covered area. The first alternative according to the invention describes exactly this configuration according to the invention, which leads to improved ventilation. According to the invention, the material of the cover film is designed in such a way that ultimately at least the two described states can be configured in the state of use of the sheet and/or cover.

In this context, it is understood that the state of use in the first alternative according to the invention represents a so-called "ideal state". Ultimately, in the "ideal state", further external weather influences in addition to the outside temperature, such as wind and/or rain and/or moist surfaces, are more preferably to be disregarded. The "ideal state"

describes in particular an at least substantially windless and dry state of use of the cover film.

Furthermore, the use condition contemplates that the sheet is used to cover cultivated plants—for example, if the sheet is used to cover a greenhouse and/or foil tunnel. When using the sheet for foil tunnels and/or greenhouses, it is understood that open areas of the respective foil tunnel of the greenhouse may also be provided.

For example, the foil tunnel can be configured to be open at the front sides. There may also be a gap between the cover or sheet and the ground, in particular if the sheet is placed on a framework or the like.

In addition, when the sheet is used in a greenhouse or for covering a greenhouse, it may be provided that further ventilation openings, such as doors or the like, are present.

The transition temperature $T_1$ refers in particular to the temperature of the greenhouse climate. It is understood that the temperature of the greenhouse climate is not measured and/or determined at the further openings, such as, for example, at the opened front sides of the foil tunnel and/or at the further ventilation openings of the greenhouse, but in the central, covered area, preferably at least substantially below the sheet. Thus, it can be provided that the transition temperature $T_1$ is measured and/or determined in the center of the sheet, for example with a deviation of +/−30%, in relation to the longitudinal sheet direction. The distance between the temperature measuring point and the underside of the sheet facing the cultivated plants can be less than 3 m, preferably less than 2 m, more preferably less than 1 m.

It is further understood according to the invention that the transition temperature $T_1$ of the greenhouse climate is influenced by the external temperature outside the covered area.

The second alternative according to the invention ultimately describes at least one material property of the cover film which makes it possible for the material of the cover film to be configured in such a way that, due to the different properties between the cover film and the basic film, it can be achieved that the cover film fits and/or clings against the ventilation openings (in particular to close them) if ventilation is not yet required in the covered region. This is ultimately achieved in particular by at least one different material composition of the cover film and the basic film.

It is therefore also understood that the two alternatives according to the invention are more preferably combined with each other.

The self-regulating configuration of the ventilation underneath the cover according to the invention can make it possible that no excessively high or low temperatures of the greenhouse climate occur, which would otherwise have a detrimental effect and/or a harmful effect on the cultivation of the cultivated plants.

According to the invention, improved cultivation of the cultivated plants can thus be ensured.

As previously explained, the elongated sheet can be used to take advantage of the greenhouse effect. Similar to the atmospheric greenhouse effect, solar radiation can thereby penetrate the covered area and heat it. The converted heat is subsequently distributed by convection of the heated air and in particular also by infrared radiation. The sheet according to the invention thus makes it possible for at least a large part of the rising warm air to be "trapped" inside and/or in the covered area. The sheet provides a barrier to convection, preventing the rising air mass from exiting the covered area. On the other hand, the ventilation openings of the invention ensure that ventilation is still possible to maintain optimal growing conditions.

Furthermore, the cover also protects the cultivated plants from precipitation and/or heavy rain and thus improves the growing conditions for the cultivated plants. Through the sheet according to the invention, therefore, a regulation of the greenhouse climate can be achieved.

In particular, the sheet according to the invention is used for warm houses, which are operated more preferably at temperatures above 18° C.

Particularly preferably, internal temperatures of the greenhouse climate of more than 50° C., preferably of more than 45° C., can be at least substantially reliably avoided, in particular provided that the external temperature and/or outside temperature remains below 50° C., preferably below 40° C.

The ventilation openings of the ventilation areas serve in particular to ventilate and/or deventilate the covered area.

Preferably, the ventilation openings of the ventilation area according to the invention are provided in the roof area of the foil tunnel and/or the greenhouse. Thus, the ventilation openings of the ventilation area can provide a so-called roof ventilation area. It is understood that when the sheet is used as a greenhouse cover, other open areas of the greenhouse may also be provided. When the sheet is used to cover foil tunnels, it can be provided, for example, that a longitudinal area, for example a continuous one, and/or window openings can be configured in the area of the side surfaces of the foil tunnel. A ventilation opening can also be provided in the area of the front sides of the foil tunnel. Further ventilation openings can improve the valve system.

In addition, the cover film can extend continuously in the longitudinal sheet direction and/or over the entire length of the basic film. The cover film is especially designed to completely cover the ventilation area. Especially preferably, the cover film can overlap the ventilation area with its edge area, especially at least on one side (in relation to the longitudinal edge of the basic film), even more preferably on both sides.

Alternatively, it may also be provided that the cover film comprises individual sections which preferably adjoin one another afterwards and/or are arranged to overlap one another. The individual sections of the cover film are especially designed at least essentially to cover the ventilation area. Especially the ventilation openings are covered and/or obscured by the cover film.

Preferably, the ventilation area comprises a plurality of neighbouring ventilation sections arranged one behind the other in the longitudinal sheet direction. Especially one ventilation section comprises at least one ventilation opening. Preferably all ventilation openings are arranged in ventilation sections, preferably grouped together. In this way the ventilation sections can each represent a grouped arrangement of ventilation openings. The ventilation sections can be provided over the entire longitudinal sheet direction and can be covered especially by the cover film.

In addition, the ventilation area can comprise two ventilation segments, preferably mirror-symmetrical to each other, which are opposite each other at least in some areas. The ventilation segments can be designed especially in longitudinal direction. Preferably, the basic film can comprise at least two longitudinal segments on which the respective ventilation segments can be arranged. The ventilation segments of the longitudinal segments can thereby be arranged in the central area of the basic film and especially facing each other.

This is particularly advantageous if the sheet is used as a gable roof, for example. In the case of a gable roof, it may be provided that the separating line separating the ventilation segments and/or the longitudinal segments of the basic film, which preferably forms the centre line of the sheet, is placed on a tension cable, frame and/or at least one support post. As a result, the ventilation of the covered area can be ensured in the area of the ridge of the gable roof and/or over the central area of the sheet. In this area, especially the hot and/or humid air of the covered area of the cultivated plants accumulates, which can escape via the ventilation openings. A fresh air supply can be provided at the same time.

With the mirror-symmetrical design of the ventilation segments, especially the mirror axis can be designed by the longitudinal axis of the sheet and/or by the separating line. Alternatively, or additionally, the mirror axis can also be the axis defined by the support on a tension cable and/or support means, such as a bar of a frame.

It is particularly advantageous if a ventilation section is framed by at least two connecting sections and/or weldings. Especially, a ventilation section can be enclosed by two weldings. Preferably, the sloping design of a connection area can be provided, especially on both sides of the ventilation sections.

In a more preferably embodiment of the present invention, it is provided that the cover film and/or the basic film comprises as material polyethylene, preferably low-density polyethylene (LDPE), and/or consists thereof. Polyethylene is a material that can be used for producing films. Polyethylene, in particular LDPE, is characterized by high chemical resistance and good electrical insulation properties. The use of polyethylene as a material for the cover film and/or the basic film therefore makes it possible to provide a low-cost sheet for covering agricultural cultivated plants. A polyethylene film is also characterized by good light transmission, while at the same time offering protection against UV radiation in particular. Polyethylene film, which in particular can be used as a cover film and/or basic film, is also preferably configured to be robust.

Preferably, the cover film comprises the same material as the basic film. In this context, it can be provided that the cover film comprises further additives, in particular plasticizers, which in particular are not contained in the basic film and/or are contained at a different concentration in the basic film. For example, both the cover film and the basic film can comprise polyethylene as the material, wherein the cover film can comprise further and/or other material additives compared to the basic film. Alternatively or additionally, it can also be provided that the materials of the cover film and the basic film differ from one another. Ultimately, the material of the cover film is selected as a function of the material of the basic film in such a way that the ventilation behavior according to the invention, which in particular ensures the self-regulating ventilation system, can be achieved.

In a further preferred embodiment of the invention, the cover film and/or the basic film comprises an additional material made of plastic and/or an additional material made of a polymer. In particular, the additive material may include ethylene vinyl acetate copolymer (EVA), linear low density polyethylene (LLDPE), high density polyethylene (HDPE) and/or medium density polyethylene (MDPE), and/or mixtures thereof. The aforementioned additional materials make it possible to further improve the nature and/or quality of the film material for the cover film and/or the basic film, and in particular to optimize it for the condition of use. Thus, the aforementioned additional material can influence the stiffness and/or the softness and/or the density and/or the grammage of the respective film in a manner advantageous for the invention. Films with a low density and/or with a low grammage are characterized in particular by reduced material consumption and are thus preferred for ecological reasons.

Preferably, the cover film and/or the basic film is/are formed as a single layer. The single-layer configuration of the aforementioned films makes it possible to provide a cost-effective sheet for covering agricultural cultivated plants.

In principle, however, in further embodiments it can also be provided that the cover film and/or the basic film comprise a multilayer structure. In particular, different materials, in particular with different properties and/or functions, can be used in the multiple layers. In addition, a multilayer material can also have the advantage of increasing the robustness of the cover film and/or the basic film, so that in particular use under adverse weather conditions can be ensured.

Particularly preferably, the nature and/or quality, in particular the texture and/or the layer structure, of the basic film differs from that of the cover film. In particular, the cover film can comprise a smaller layer thickness than the basic film. In the case of a multilayer structure of the cover film or the basic film, the layer thickness means the total layer thickness. The lower layer thickness can ensure that the cover film can provide the ventilation properties of the sheet according to the invention in the state of use by being applied and reapplied to the ventilation openings.

Furthermore, in particular, electrical attraction and/or charging of the cover film and/or the basic film can be used to ensure laying and/or placing of the cover film to the ventilation area, in particular for closing the openings.

More preferably, the cover film can be configured as a monoaxially or biaxially stretched film web. Monoaxially stretched means in particular that the film has been stretched on one side (mono) in the machine direction, preferably after extrusion, and is thus preferably very tear-resistant and in particular no longer expands in this direction. Biaxial stretching makes it possible to further increase the tensile strength, since stretching has previously taken place in the transverse and longitudinal directions. In particular, biaxial stretching can increase the cohesion of the molecules so that they are entangled with one another and thus significantly improved mechanical properties can be achieved. In particular, the cover film can be made of the same material and/or material combination as the basic film, but comprise a grammage than the basic film due to the monoaxial or biaxial stretching. Thus, the stretching can ensure the different properties of the cover film and the basic film in the state of use.

In a further preferred embodiment, the cover film comprises an embossing and/or is configured to be embossed. In particular, the embossing can be introduced into the cover film by means of pressure, preferably pressing, and/or by means of heat. Ultimately, the embossing of the cover film can achieve a three-dimensional deformation of the cover film. The embossing can give the cover film such a texture and/or condition and/or quality that the stiffness of the cover film can be reduced. Due to a less stiff behavior of the cover film, in particular in comparison to the basic film, a lifting and a contact (closing of the ventilation openings) of the cover film to the ventilation openings of the basic film in the state of use can be ensured depending on the transition temperature $T_1$ of the greenhouse climate.

Furthermore, it can be provided that the cover film comprises and/or consists of very low density polyethylene (VLDPE), ultra low density polyethylene (ULDPE), a plastomeric material and/or mixtures thereof. The aforementioned materials particularly ensure the configuration of a soft and/or elastic cover film. In particular, the material of the cover film is softer than that of the basic film, wherein it can be achieved by the afore-mentioned materials and/or the addition of the aforementioned materials that the cover film is configured softer than the basic film. At the same time, however, the mechanical properties of the cover film and/or the basic film with regard to the necessary stability can be maintained by the aforementioned materials.

Preferably, the basic film comprises a width of between 0.5 and 40 m, preferably between 1 and 20 m, more preferably between 1.5 and 15 m. The aforementioned widths are, in particular, standard widths in the prior art for a cover or a sheet for use as a greenhouse film, in particular for foil tunnels. The width of the cover film can be configured smaller than the width of the basic film. This results from the mere fact that the cover film is only used to cover the central area of the basic film where the ventilation area is provided. The cover foil may further preferably comprise a width of at least 10 cm, preferably between 10 cm to 2 m, more preferably greater than 50 cm, preferably between 100 cm to 150 cm.

According to the invention, the sheet can preferably comprise a length of at least 1 m, more preferably between 2 to 1000 m, more preferably between 10 to 800 m. The length of the sheet can in particular be configured depending on the use. For example, the sheet can be provided to the user as roll material. The user can then use the sheet as required for the particular cultivation—i.e. for a greenhouse, foil tunnel and/or for other constructions to cover the cultivated plants.

In a further preferred embodiment of the present invention, it is provided that the distance between two weldings and/or connection areas immediately adjacent in longitudinal sheet direction between the basic film and the cover film is at least 5 cm, preferably at least 20 cm, more preferably between 25 to 60 cm. Preferably, the connection areas and/or the weldings are at least substantially regularly spaced and each configure a free space therebetween. In particular, it may be provided that the free space has a length, preferably a maximum length, extending in longitudinal sheet direction of at least 5 cm, more preferably between 25 to 50 cm. A plurality of ventilation openings may be arranged in the free space.

Preferably, the cover film comprises a layer thickness of at least 50 μm, more preferably between 60 to 300 μm, more preferably between 150 to 200 μm. The layer thicknesses of the aforementioned type make it possible to provide both a stable and a soft cover film at the same time, which can enable self-regulation of the ventilation of the greenhouse climate due to its material properties. Particularly preferably, the cover film can comprise a grammage of at least 20 g/m$^2$, preferably between 50 to 500 g/m$^2$, more preferably between 110 to 180 g/m$^2$. Also, grammages of the type mentioned above make it possible to ensure that the cover film can be used in accordance with the invention.

The basic film can preferably comprise a greater layer thickness than the cover film and/or a higher basis weight than the cover film. In particular, the basic film comprises a layer thickness of at least 70 μm, preferably between 80 and 350 μm, more preferably between 200 and 300 μm. Alternatively or additionally, it may be provided that the basic film comprises a grammage of at least 50 g/m$^2$, more preferably between 100 to 800 g/m$^2$, more preferably between 200 to 250 g/m$^2$.

In a further preferred embodiment of the invention, the transition temperature $T_1$ is greater than 20° C., preferably greater than 30° C., more preferably between 30 to 50° C. and in particular 38° C.+/−5° C.

Transition temperatures $T_1$ of the aforementioned type make it possible to provide an optimal temperature for the cultivation of the cultivated plants for the greenhouse climate. In this context, it is understood that, depending on the state of use and/or on the cultivated plants to be cultivated, different transition temperatures $T_1$ can be provided by selecting the texture and/or the nature and/or the quality of the cover film. It is further understood in this context that the transition temperature $T_1$ in the state of use also results depending on the outside temperature and depending on the size or the number of further ventilation openings. The aforementioned transition temperature $T_1$ presupposes in particular that there is at least substantially complete covering of the cultivated plants, in particular complete covering of the greenhouse or the foil tunnel by the sheet according to the invention, so that an initially substantially closed and/or enclosed space results. Also, the aforementioned transition temperature $T_1$ assumes that it is measured in particular in the central area in relation to the longitudinal sheet direction, preferably in a range of +/−30% starting from the geometric center of the length of the sheet.

Preferably, at least one ventilation opening, in particular all ventilation openings of the ventilation area(s), comprises a maximum diameter of at least 3 mm, preferably at least 30 mm, more preferably between 50 to 100 mm. Diameters of the aforementioned type more preferably allow a sufficiently high air exchange of the covered area and can also be closed and/or covered by the cover film.

Preferably, it is intended that the sum of the areas of all ventilation openings corresponds to at least 1%, preferably between 1.1% and 3%, even more preferably between 1.3% and 2%, of the total area of the basic film.

By the above-mentioned size ratio between the area of all ventilation openings taken up and the total area of the basic film an improved ventilation and/or deaeration via the ventilation area can be ensured. Tests have shown that especially at least 1% of the total area of the basic film ensures a very good to ideal ventilation. In practice, this area is considerably smaller and especially amounts to a maximum of 0.5%.

In the tests carried out it has been further established that, the above-mentioned ratios between the area of a ventilation opening and the total area of the basic film allow for an improved use of the sheet and a better harvest result.

The connection area is preferably designed to be inclined and/or oblique with respect to a weld start point and a weld end point in relation to the cross direction running orthogonally to the longitudinal sheet direction.

However, according to the invention it is also possible to design the connection area straight and/or with straight and/or parallel weldings, in particular with respect to a weld start point and a weld end point in relation to the cross direction running orthogonally to the longitudinal sheet direction. Preferably, the weldings can be at least substantially parallel to the cross direction of the sheet. Thus, it is also possible to have straight weldings —although the oblique weldings are advantageous. According to the invention, the self-regulating system can preferably be reached independent from the form of the weldings.

The inclination and/or oblique arrangement between the weld start point and the weld end point is to be understood in particular as meaning that the line connecting the weld start point with the weld end point, especially an "imaginary" line, is arranged inclined and/or angled and/or oblique with respect to the cross direction.

In particular, the free spaces are each provided above a ventilation section and/or the connection areas are designed in such a way that the free space tapers towards a longitudinal edge of the sheet, especially a longitudinal edge of the basic film.

Accordingly, such free space can be provided which comprises a narrowing shape due to the inclination of the connection area with respect to the cross direction. According to the invention, it has been found that this can ensure better ventilation and/or deaeration of the covered area. If the line connecting the weld start point with the weld end point had been arranged at least essentially in the cross direction of the sheet, a corrugated arrangement of the cover film on the basic film to form free spaces would have been possible, but these free spaces could not ensure a tapering of the covered area compared to an inclined connection area.

Preferably, the weld start point is the outermost point of the connection area facing a first longitudinal edge of the sheet, especially wherein the weld end point is the outermost end point of the connection area facing the further longitudinal edge of the basic film opposite the first longitudinal edge. Between the weld start point and the weld end point there is thus a displacement in cross direction. This especially allows that when a transverse force and/or a force directed in cross direction is applied to the sheet, the geometry of the connection area allows the elongation to be applied at lower levels near the weld end point and at higher levels near the weld start point. This results in the free space and/or cover film in the area between neighbouring connection areas being widened so that air can escape more easily. The further the sheet is stretched, especially along the cross direction, the larger the opening or free space becomes.

The connection area can be designed especially symmetrically, preferably mirror-symmetrically, or not symmetrically in relation to the cross direction. In principle, the connection area can be composed of two or more components. The connection area can also comprise continuous, punctual or interrupted individual welding sections.

In a further preferred embodiment, it is intended that the line connecting the weld start point with the weld end point, especially an imaginary line, encloses an angle of at least 5° to the cross direction. Preferably, the aforementioned angle is between 5° and 70°, even more preferably between 30° and 50°. In this context it is understood that the line connecting the weld start point with the weld end point does not have to be designed as a weld line or section—but it can be.

Ultimately, according to the invention, it is intended that the weld start point is a weld point and/or lies on a weld line. The weld end point is also a weld point and lies on the same weld line as the weld start point, on a further weld line and/or a further weld section. The weld line of the weld start point does not have to be directly connected to the further welding line of the weld end point.

In tests carried out according to the invention, it has been found that an angle of the above-mentioned magnitude allows such free space, which ensures optimum air circulation and especially leads to improved ventilation of the covered area. In this way, the hot and/or humid air of the covered area can escape via the free space, the geometry of which has been increased and improved by the above-mentioned angle arrangements.

In addition, it is understood that further welding points or sections may be provided between which the above-mentioned ratios of the weld start point and the weld end point do not apply.

According to the invention, it is intended that at least one weld start point and at least one weld end point are provided which can ensure the previously explained inclination.

Preferably, at least one connection area comprises at least one welding which is straight or inclined with respect to the cross direction running orthogonally to the longitudinal direction—i.e. inclined with respect to the cross direction—and preferably continuous. The above-mentioned oblique welding limits the free space and allows the weld start point and weld end point to be arranged at an angle.

Especially the weld start point and the weld end point are provided at a common welding. Thus, both the weld start point and the weld end point can be arranged on the sloping welding, which is preferably designed to be continuous.

In this context, it is understood that the connection area can also include further welds/weldings, which especially do not run diagonally to the cross direction and/or on which neither the weld start point nor the weld end point is arranged.

Alternatively, it may be provided that the weld start point is arranged on a first welding line and the weld end point on a further welding line which is spaced from and/or shifted from the first welding line. Consequently, the weld start point and the weld end point can be arranged on different welding lines, which preferably do not merge into each other. Especially both the first and the further welding line can run at least essentially in cross direction.

In further embodiments, it may also be provided that the first and/or the second welding line is arranged at an angle to the cross direction or includes an angle of at least 5° to the cross direction.

Further features, advantages and possible applications of the present invention result from the following description of embodiment examples based on the drawing and the drawing itself. Thereby all described and/or pictorially depicted features, either on their own or in any combination, form the subject matter of the present invention, irrespective of their summary in the aspects and their retrospective relationship.

It shows:

FIG. 1 a schematic top view of a part of a sheet according to the invention, FIG. 2 a schematic top view of an area of a further embodiment of a sheet according to the invention, FIG. 3 a schematic top view of an area of a further embodiment of a sheet according to the invention, FIG. 4 is a schematic top view of an area of a further embodiment of a sheet according to the invention, FIG. 5 a schematic top view of an area of a further embodiment of a sheet according to the invention, FIG. 6 a schematic sectional view of the sheet shown in FIG. 5 in the state of use along the cut A-A, FIG. 7 a schematic sectional view of the area of the sheet shown in FIG. 5 in the state of use along cut B-B, FIG. 8 a schematic sectional view of the area of the sheet shown in FIG. 5 in the state of use along cut C-C, FIG. 9 a schematic sectional view of the area of the sheet shown in FIG. 5 in the state of use along the cut D-D, FIG. 10 a schematic sectional view of the area of the sheet shown in FIG. 5 in the state of use along cut E-E, FIG. 11 a schematic illustration in perspective of a part of the sheet in the state of use, FIG. 12 a schematic top view of a part of a further embodiment of a sheet according to the invention, FIG. 13 a schematic illustration of a ventilation opening according to the invention, FIG. 14 a schematic illustration of a further embodiment of a ventilation opening according to the invention, FIG. 15 a schematic illustration of a further embodiment of a ventilation opening according to the invention, FIG. 16 a schematic illustration of a further embodiment of a ventilation opening according to the invention, FIG. 17 a schematic illustration of a further embodiment of a ventilation opening according to the invention, FIG. 18 a schematic illustration of a further embodiment of a ventilation opening according to the invention, FIG. 19 a schematic illustration of a further embodiment of a ventilation opening according to the invention, FIG. 20 a schematic illustration of a further embodiment of a ventilation opening according to the invention, FIG. 21 a schematic illustration of a further embodiment of a ventilation opening according to the invention, FIG. 22 a schematic illustration of a further embodiment of a ventilation opening according to the invention, FIG. 23 a schematic illustration of a further embodiment of a ventilation opening according to the invention, FIG. 24 a schematic illustration of a further embodiment of a ventilation opening in accordance with the invention, FIG. 25 a schematic illustration of a connection area according to the invention, FIG. 26 a schematic illustration of a further embodiment of a connection area according to the invention, FIG. 27 a schematic illustration of a further embodiment of a connection area according to the invention, FIG. 28 a schematic illustration of a further embodiment of a connection area according to the invention, FIG. 29 a schematic illustration of a further embodiment of a connection area according to the invention, FIG. 30 a schematic illustration in perspective of a further embodiment of a sheet according to the invention in the state of use, FIG. 31 a schematic sectional view of the sheet according to the invention in a first state, FIG. 32 a schematic sectional view of the sheet according to the invention in a second state, FIG. 33 a schematic illustration in perspective of the use of the sheet according to the invention, FIG. 34 a schematic illustration in perspective of the use of the sheet according to the invention in a second state, FIG. 35 a schematic illustration in perspective of the use of the sheet according to the invention in a first state, FIG. 36 a schematic illustration in perspective of the use of the sheet according to the invention showing the covered area and FIG. 37 a schematic top view of an area of a further embodiment of a sheet according to the invention.

FIG. 1 shows an elongated sheet 1 for covering agricultural cultivated plants 2 to generate a greenhouse climate and/or subclimate in the covered area. The sheet comprises an elongated basic film 3 made of plastic.

Further, FIG. 1 shows that the sheet 1 comprises, in the central area 4 of the basic film 3, a ventilation area 5 extending in longitudinal sheet direction L and having a plurality of ventilation openings 6. A cover film 9 made of plastic extending in the longitudinal sheet direction L of the basic film 3 is applied to the ventilation area 5, producing free spaces 11 for air exchange, and is firmly welded to the basic film 3 via a plurality of connection areas 10 following one another in the longitudinal sheet direction L. The cover film 9 is used in particular to protect the basic film 3 from damage. The cover film 9 serves in particular to cover and/or overlap the ventilation openings 6. The cover film 9 can also be elongated and preferably extend over the entire length of the basic film 3. However, it is also possible for the cover film 9 to comprise a shorter length than the basic film 3. The cover film 9 can be composed of several pieces arranged one behind the other in longitudinal sheet direction.

The sheet 1 may in particular be provided for providing a greenhouse or a foil tunnel 33. Foil tunnels 33 are shown, for example, in FIG. 33. FIG. 33 further shows that the foil tunnel 33 is configured to be open and/or open at its front sides 34.

FIGS. 34 and 35 show a further state of use of the sheet 1. In this context, too, it may be envisaged that the sheet is used as a foil tunnel 33. The foil tunnel 33 can be achieved in particular by placing the sheet 1 on a frame-like scaffolding structure and/or framework 35. The framework 35 may be constructed from transverse and/or longitudinal struts and/or by bent bars. FIG. 34 shows that the front sides 34 of the foil tunnel 33 are configured to be at least partially closed. In the area of the longitudinal sides 36 of the foil tunnel 33, it can be provided that the sheet 1 and/or the basic film 3 extends to the floor. However, it may also be provided that a spacing is provided with production of a ventilation area between the end of the basic film 3 and the floor.

Even if the front sides 34 of the foil tunnel 33 or certain side areas on the longitudinal sides 36 are configured open, a greenhouse climate of the covered area can be ensured. The covered area can be seen, for example, in FIG. 36.

FIGS. 31 and 32 show different states that the sheet 1 can have. The material and/or the nature and/or quality of the cover film 9 is selected in such a way that the states shown in FIGS. 31 and 32 can be realized and/or obtained.

The first state, shown in FIG. 31, is characterized by the fact that the temperature T in the covered area and/or the temperature T of the greenhouse climate is below a transition temperature $T_1$. The transition temperature $T_1$ can variate depending on different uses, in particular depending on different cultivated plants. The temperature $T_1$ also depends on the outdoor temperature $T_0$. The outside temperature $T_0$ is determined outside the covered area, in particular outside the greenhouse and/or the foil tunnel 33. The temperature $T_1$ and also the temperature T of the greenhouse climate can be configured larger than the temperature $T_0$ due to the greenhouse effect achieved by covering with the sheet 1. In this context, it is understood that the temperature T of the greenhouse climate (to determine the difference to the transition temperature $T_1$) is determined in the covered area. Furthermore, the temperature T of the greenhouse climate is to be determined in the central area 4 of the sheet 1 in relation to the longitudinal direction L, in particular with a maximum deviation of +/−30% of the length of the sheet 1 starting from the center. Also, the temperature T of the greenhouse climate is determined in the roof area of the covered area, in particular with a maximum distance of less than 1 m to the underside of the sheet 1 facing the cultivated plants 2.

In the first state shown in FIG. 31, the underside of the cover film 9 lies flat against and/or on the upper side of the basic film 3 at least substantially in the area of the free spaces 11. In this context, it can be provided that the cover film 9 covers and/or closes at least 60%, more preferably at least 80%, and in particular all ventilation openings 6.

FIG. 32 shows a second state of the sheet 1 shown in FIG. 31. This second state can be realized due to the material and/or the nature and/or quality of the cover film 9, in particular in relation to the basic film 3. The second state shown in FIG. 32 results in particular at a temperature T in the covered area which is greater than the transition temperature $T_1$. In the second state, it is envisaged that the cover film 9 lifts off and/or has already lifted off in certain areas relative to the upper side of the basic film 3 with the production of free spaces 11. This allows the heated air to escape from the covered area via the ventilation openings 6, as shown schematically in FIG. 32. The transition between the first and the second state results in particular from convection of the heated air in the covered area. In this context, it is understood that the first and the second state can also have due to external weather conditions, for example due to heavy rain and/or by wind and/or in case of wet surfaces, in particular due to adhesion effects. It is understood, however, that a change of states as a function of the transition temperature $T_1$ can result due to the material and/or the nature and/or the quality of the cover foil 9 and in particular without the need for external further influencing weather conditions, such as wind and/or rain.

Ultimately, the cover film 9 is in (in particular full-surface) contact with the upper side of the basic film 3 up to the transition temperature $T_1$, wherein at a temperature T in the covered area above the transition temperature $T_1$, the cover film 9 lifts off or has already lifted off at least in part relative to the upper side of the basic film 3 with production and/or forming of free spaces 11.

In the embodiment shown in FIG. 1, it is provided that the cover film and/or the material of the cover film 9 is configured to be more elastic and/or softer and/or less rigid than the basic film 3 and/or the material of the basic film 3. Alternatively or additionally, in further embodiments not shown in more detail, it can also be provided that the cover film 9 comprises a lower weight per unit area and/or grammage than the basic film 3. It is understood that the aforementioned material properties of the cover film 9 can be used in particular to ensure the change of state as shown schematically in FIGS. 31 and 32.

A self-regulating system of the greenhouse climate can be ensured by a possible change of the ventilation behavior in the covered area adapted to the transition temperature $T_1$. FIGS. 34 and 35 also show the two different states that are realized, in particular, when the temperature T in the covered area exceeds $T_1$. FIG. 34 shows a second state in which the temperature T in the covered area is above the transition temperature $T_1$, whereas FIG. 35 shows the first state in which the cover film 9 covers the ventilation openings 6 and the temperature T in the covered area is below the transition temperature $T_1$. The cover film 9 shown in FIG. 31 and the basic film 3 shown in FIG. 31 may comprise polyethylene, in particular low-density polyethylene (LDPE), as the material. In further embodiments, it may also be provided that the cover film 9 and/or the basic film 3 are made of polyethylene.

Provided that the temperature T in the covered area corresponds exactly to the transition temperature $T_1$, the cover film 9 changes from the first state to the second state—that is, it starts to lift off.

In the case of the cover film 9 shown in FIG. 31, it is provided that it comprises a different material than the basic film 3. In further embodiments, however, it can also be provided that both the cover film 9 and the basic film 3 are composed of the same material. Then, the nature and/or the quality of the cover film 9 can be adapted such that in particular the two previously discussed states of the sheet 1 can be realized and/or obtained.

Not shown in more detail is that the cover film 9 and/or the basic film 3 comprise an additional material of plastic and/or a polymer, in particular ethylene-vinyl acetate copolymer (EVA), linear low density polyethylene (LLDPE), high density polyethylene (HDPE) and/or medium density polyethylene (MDPE) and/or mixtures thereof.

The cover film 9 shown in the embodiments illustrated and the basic film 3 are each configured as a single layer. In further embodiments not shown in more detail, however, it is also possible to provide for a multilayer structure of the basic film 3 and/or the cover film 9. The layered structure of the aforementioned films 3, 9 can be selected in particular as a function of the desired transition temperature $T_1$ of the greenhouse climate.

It is not shown in more detail that the nature and/or the quality, in particular the texture and/or the layer structure, of the basic film 3 can differ from the cover film 9. For example, the cover film 9 can comprise a lower layer thickness than the basic film 3. In particular, the lower layer thickness can ensure that the cover film 9 can be lifted off in the second state, as shown in FIGS. 34 and 32, respectively.

Furthermore, it is not shown that in further embodiments the cover film 9 may be configured as a monoaxial or biaxial stretched film web and/or film sheet. In this context, it may be provided that the basic film 3 is configured from the same material as the cover film 9, and in particular has only been unstretched relative to the cover film 9.

It is also not shown in detail that the cover film 9 can comprise an embossing. The embossed cover film 9 can thus comprise such a quality that it is possible to apply and reapply the cover film 9 to the ventilation openings 6 when the transition temperature $T_1$ in the covered area is exceeded and/or undershot.

Furthermore, the cover film 9 may comprise as material and/or consist of very low density polyethylene (VLDPE), ultra low density polyethylene (ULDPE), a plastomeric material and/or mixtures thereof. The aforementioned materials may in particular provide a less rigid cover film 9 relative to the basic film 3.

The basic film 3 may comprise a width between 0.5 to 40 m, more preferably between 1 to 20 m, more preferably between 1.5 to 15 m. The cover film 9 may comprise a width less than the basic film 3, wherein the width of the cover film 9 may in particular be greater than 50 cm, more preferably between 100 to 150 cm.

The length of the sheet 1 may vary depending on the different states of use. For example, the sheet 1 may be provided as a roll product to a customer or a user. The sheet 1 may comprise a length of at least 1 m, more preferably between 10 to 800 m.

The distance between two weldings 14 and/or connection areas 10 directly in proximity in longitudinal sheet direction L can be at least 5 cm, in particular between 25 to 60 cm, as shown in FIG. 1. In particular, the length (in particular in longitudinal sheet direction L) of the free space 11 can be at least 5 cm, in particular between 25 to 60 cm.

It is not shown in more detail that the cover film 9 can comprise a layer thickness of at least 50 μm, in particular between 150 to 200 μm. The weight per unit area of the cover film 9 can be at least 20 g/m² and in particular between 110 to 180 g/m².

Furthermore, it is not shown in more detail that the basic film 3 can comprise a layer thickness of at least 70 μm, preferably between 80 to 350 μm, more preferably between 200 to 300 μm. Furthermore, it is not shown in more detail that the basic film 3 can comprise a basis weight and/or grammage of at least 50 g/m² and in particular between 200 to 250 g/m².

The transition temperature $T_1$ and thus the selection of a particular cover film may also vary depending on different cultivation plants 2. In principle, the transition temperature $T_1$ can be configured to be greater than 20° C. In particular, the transition temperature $T_1$ is greater than 30° C., more preferably 38° C.+/−5° C. The transition temperature $T_1$ is ultimately reached as a function of the outside temperature $T_0$ provided outside the covered area.

The ventilation openings 6 shown in FIG. 1 can comprise a maximum diameter of at least 3 mm. The maximum diameter of the ventilation openings 6 and/or at least one ventilation opening 6 can preferably be between 50 and 100 mm.

In the following, reference is made to FIGS. 1 to 30, which show various embodiments of the sheet 1 according to the invention. In this context, it is understood that the features and/or aspects described below in connection with FIGS. 1 to 30 can apply to the sheet 1 configured according to the invention—but need not apply.

The following describes a further form of execution which can also be realized on its own, and which has its own inventive significance. It is understood in this context that the features, characteristics or advantages described earlier also apply in the same way to the embodiment described below, without this requiring further explicit mention.

FIG. 1 shows an elongated sheet 1 for covering cultivated plants 2. The covering of cultivated plants 2 by the sheet 1 is shown in a schematic illustration in FIG. 11.

The sheet 1 comprises a basic film 3 made of plastic. In the central area 4 of the basic film 3 there is a ventilation area 5 extending in the longitudinal sheet direction L with a plurality of ventilation openings 6.

The central area 4 of the basic film 3 is especially arranged at least essentially in the area of the centre line of the basic film 3. The centre line runs parallel to the longitudinal edges 7, 8 of the basic film 3.

It goes without saying that in other embodiments the central area 4 can also be at a distance from the centre line and/or is not designed to be mirror-symmetrical in relation to the centre line. In any case, the central area 4 is at a distance from both longitudinal edges 7, 8 of the basic film 3.

The distance to the respective longitudinal edges 7, 8 can be different. Especially the distances starting from the respective longitudinal edge of the central area 4 to the respective immediately neighbouring longitudinal edge 7, 8 differ in further embodiments by a maximum of 50%, preferably a maximum of 20%.

In addition, FIG. 4 shows that a plastic cover film 9 is provided on the ventilation area 5, running in the longitudinal sheet direction L of the basic film 3, and is firmly welded to the basic film 3 over a plurality of connection areas 10 consecutive in the longitudinal sheet direction L.

FIG. 1 does not show that the cover film 9 is connected to the basic film 3 by the connection areas 10 in such a way that free spaces 11 are formed. The free spaces 11 are shown schematically in FIG. 11. In addition, the free spaces 11 are shown in FIGS. 6, 8 and 10. FIGS. 6 to 10 are schematic sectional views of sheet 1 shown in FIG. 5 in its (actual) state of use. Sheet 1 is thereby used as a gable roof, as can be seen schematically in FIG. 11.

FIG. 6 shows cut A-A from FIG. 5, but in the state of use of the sheet 1 shown in FIG. 5. FIG. 7 shows the cut along line B-B.

FIG. 6 is a schematic illustration of free space 11. In FIG. 7 no free space 11 is available. This is finally due to the fact that the cut B-B runs through the connection areas 10.

Figure 5:
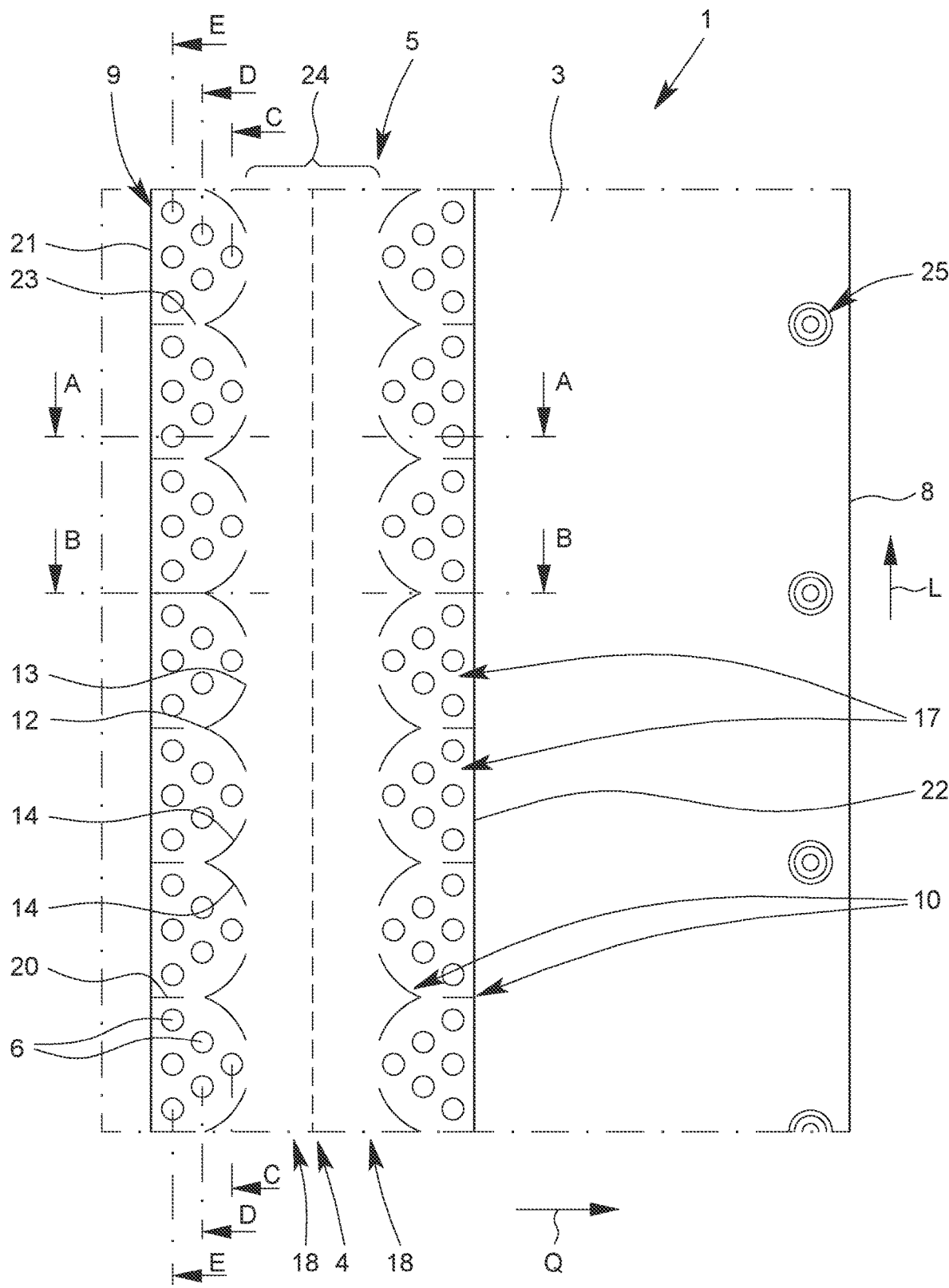
Figure 6:
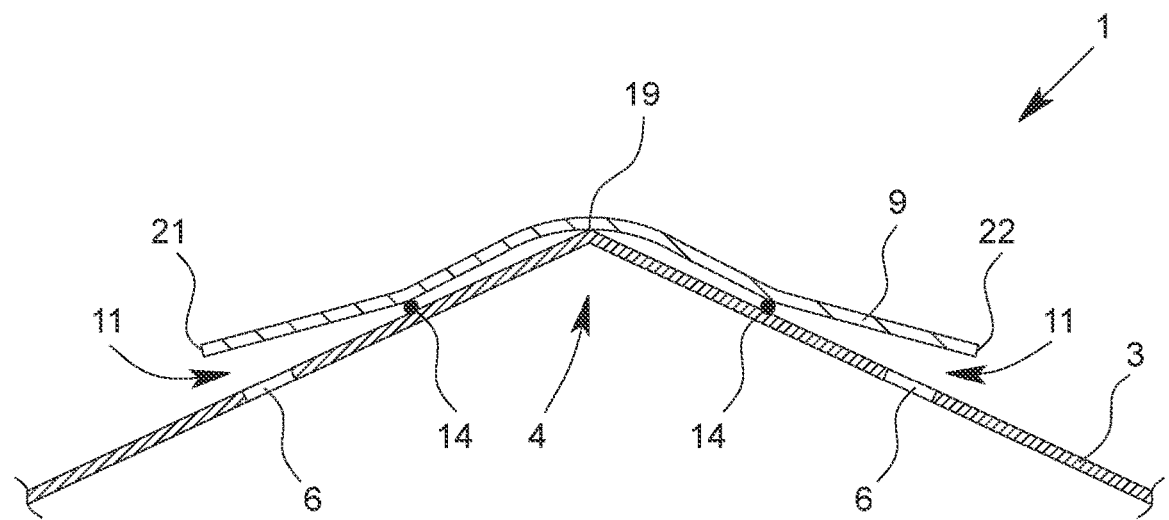
Figure 7:
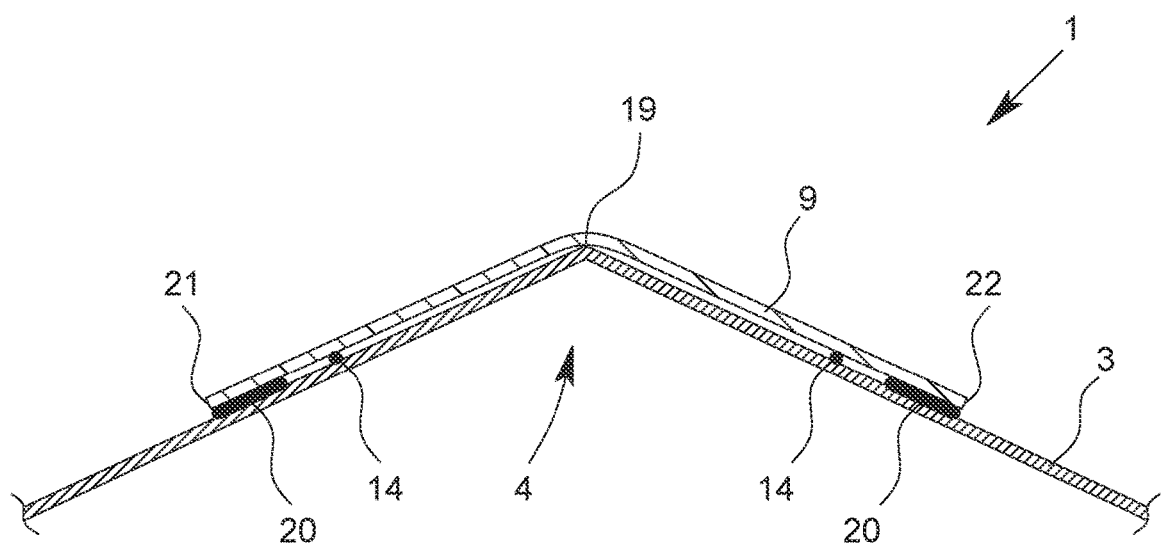
Figure 8:
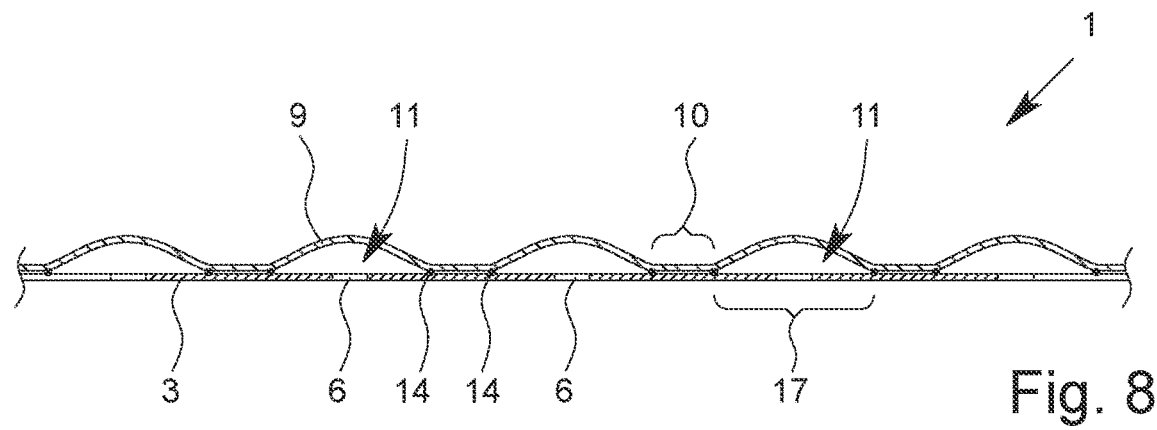
FIG. 8 shows the cut C-C from FIG. 5. The sheet 1 is shown in an elongated state, so that the free spaces 11 are shown schematically.
Figure 9:
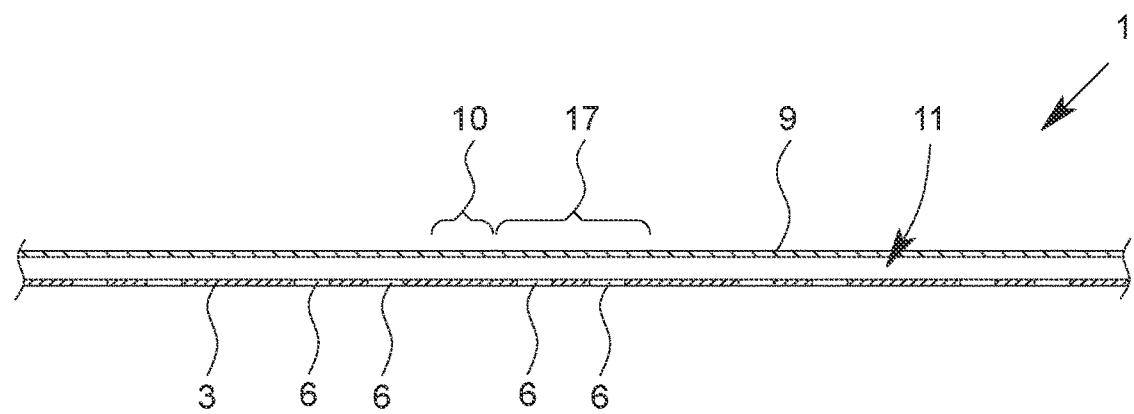
FIG. 9 shows the cut D-D from FIG. 5, wherein the free space 11 is at least essentially continuous.
Figure 10:
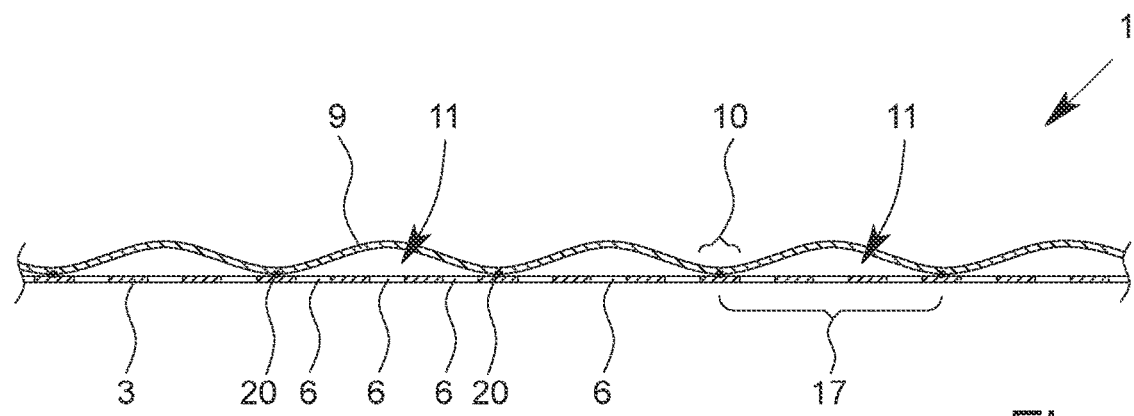

The sectional view in FIG. 10, which shows cut E-E from FIG. 5, also shows a large number of free spaces 11.

Figure 1:
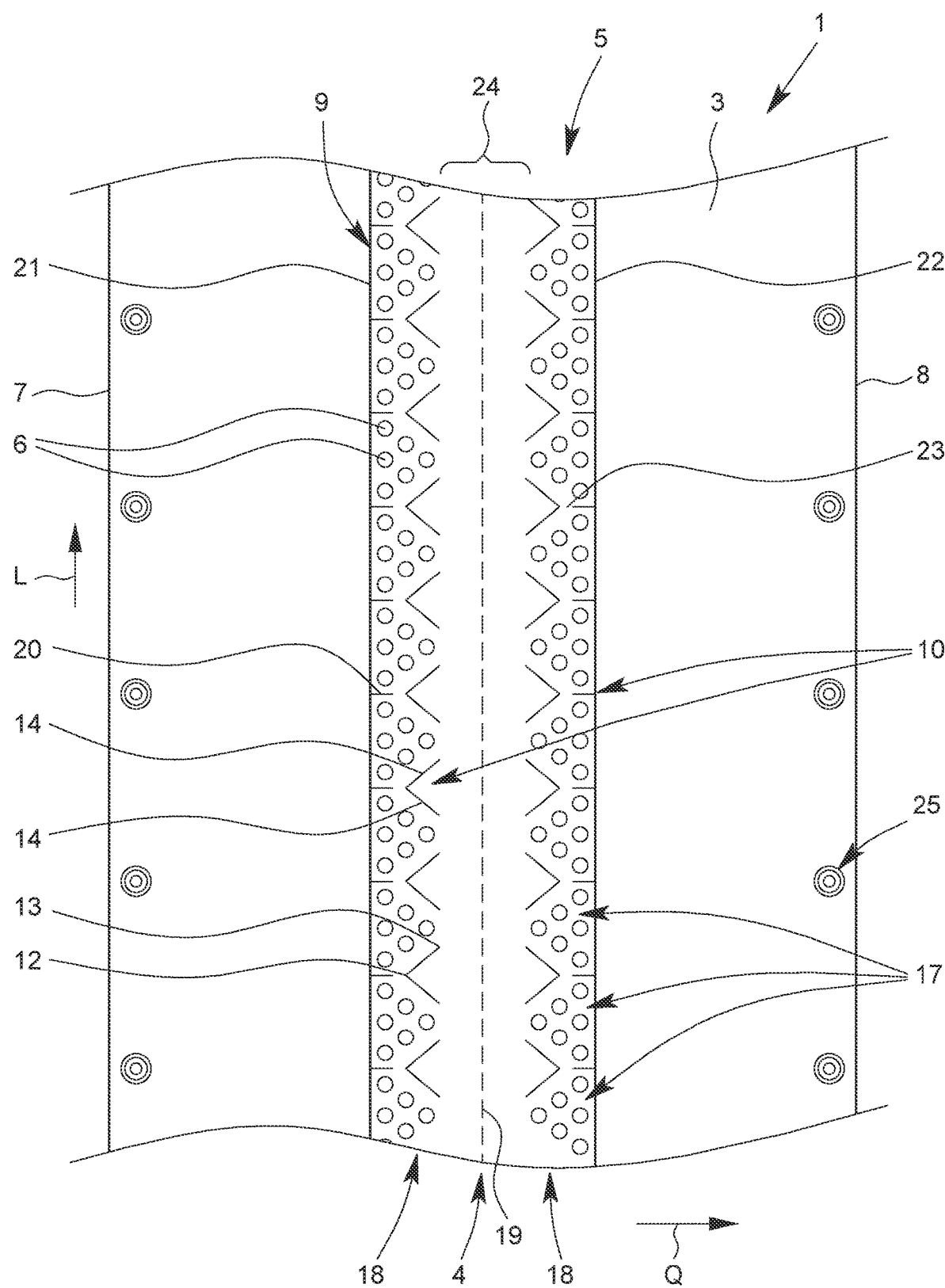

FIG. 1 shows that the connection area 10 is designed to be inclined at least in some areas with respect to a weld start point 12 and a weld end point 13 with respect to the cross direction Q running orthogonally to the longitudinal sheet direction L. The weld start point 12 and/or the weld end point 13 thereby adjoin the immediately neighbouring free space 11. Otherwise, weld points 12, 13 may represent the starting point or end point of a weld line and/or section—but need not.

An inclined design between weld start point 12 and weld end point 13 is to be understood as meaning that the line connecting the weld start point 12 with the weld end point 13, especially an imaginary line, is inclined and/or angled to the cross direction Q.

However, also straight connection areas 10 are possible, in particular having straight weldings 14, preferably with respect the cross direction Q running orthogonally to the longitudinal sheet direction L.

Figure 37:
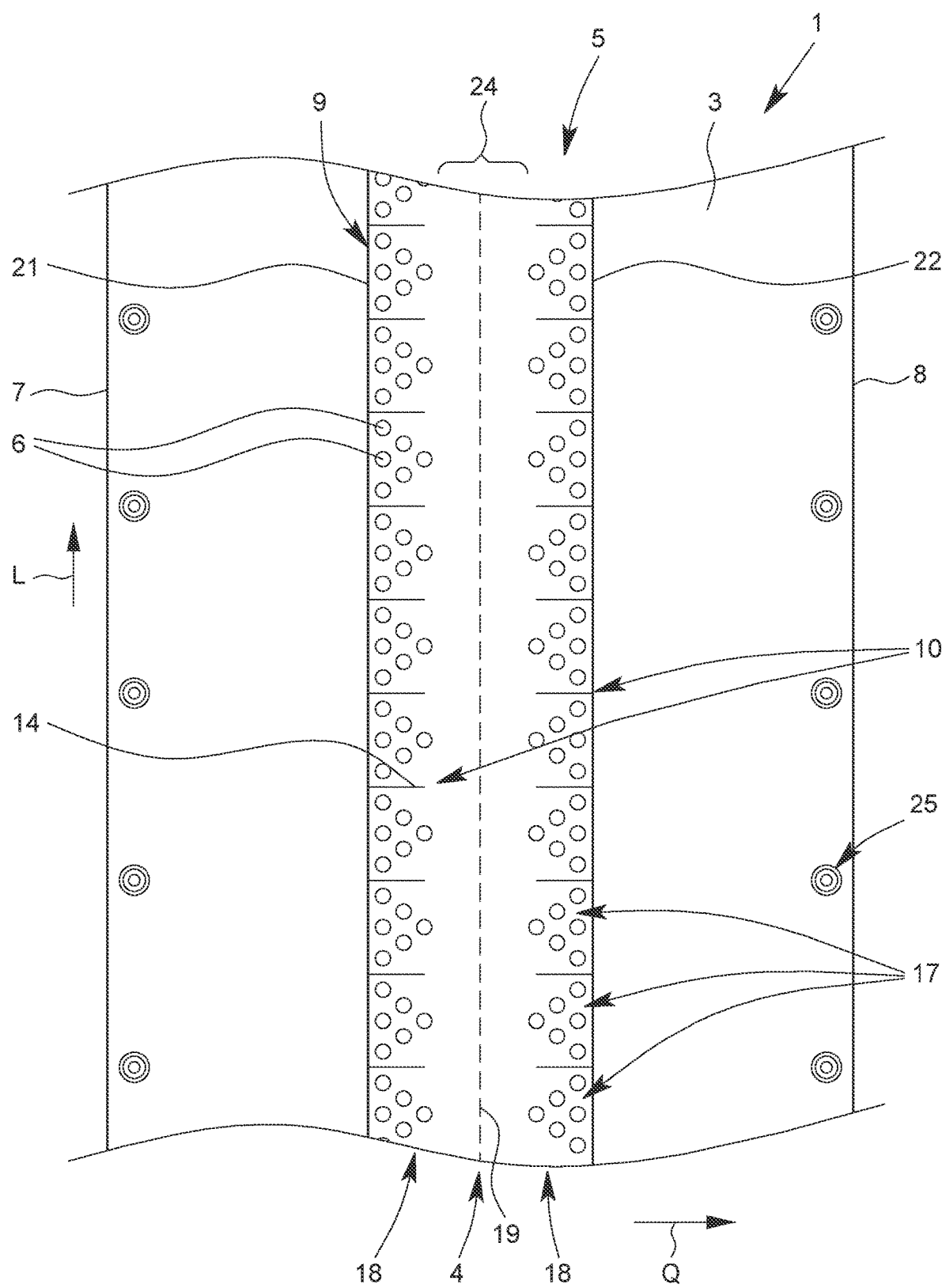

FIG. 37 shows that the connected area 10 is designed in such a way that the weldings 14 are straight, in particular at least substantially parallel with regard to the cross direction Q and in particular are arranged parallel to each other.

Figure 25:
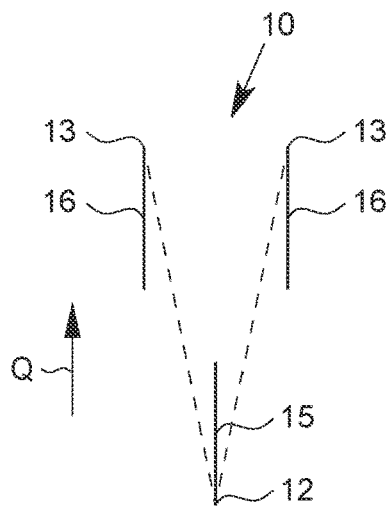
Figure 26:
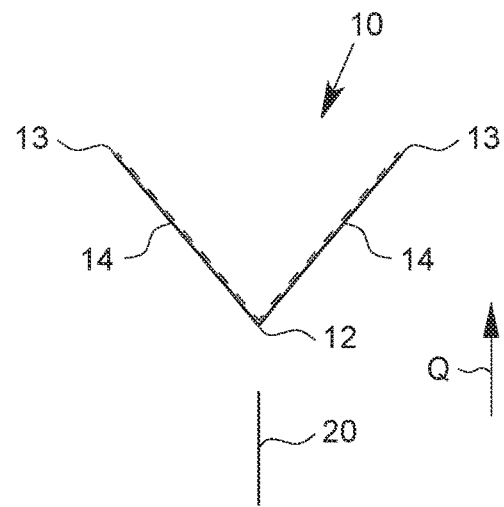
Figure 27:
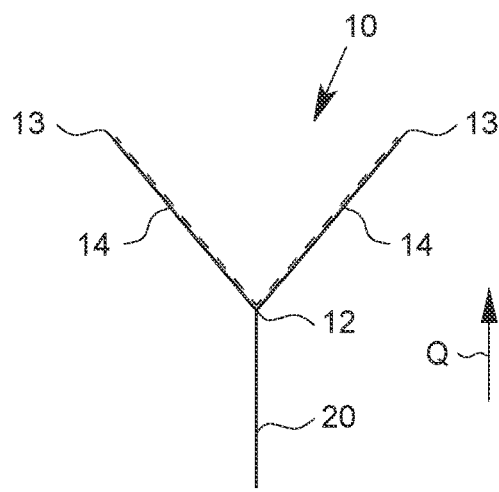
Figure 28:
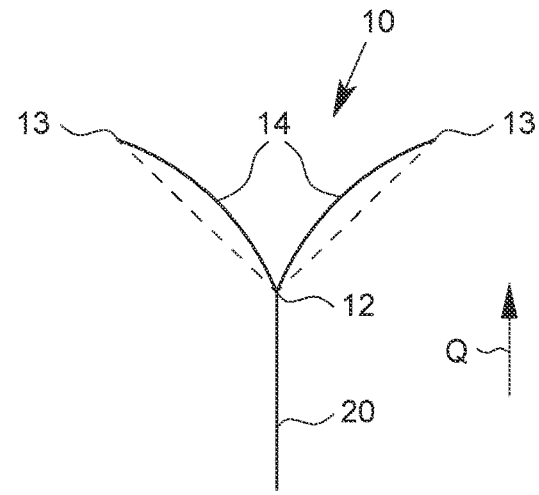
Figure 29:
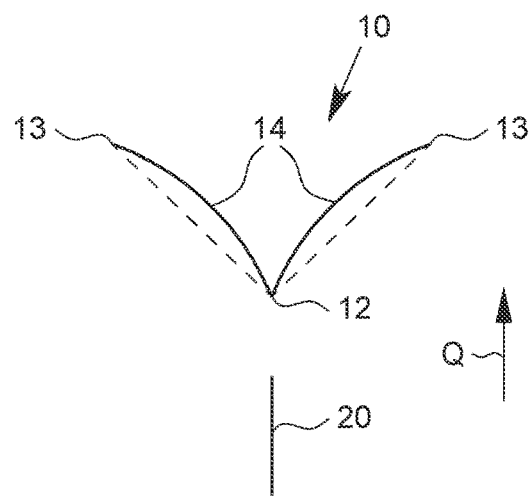

FIGS. 25 to 29 show differently shaped connection areas 10. The "imaginary" line connecting the weld start point 12 with the weld end point 13 is shown as a dashed line. It is also clear that different weld points can form the weld start point 12 and the weld end point 13. Welding points 12, 13 are preferably the outermost points of a weld line. FIG. 25 shows that weld start point 12 and weld end point 13 are located on different weld lines 15, 16.

In this connection it is understood that the connection area 10 may also include further weld spots or sections where the line connecting these weld spots or sections does not comprise an arrangement inclined to the cross direction Q.

Figure 2:
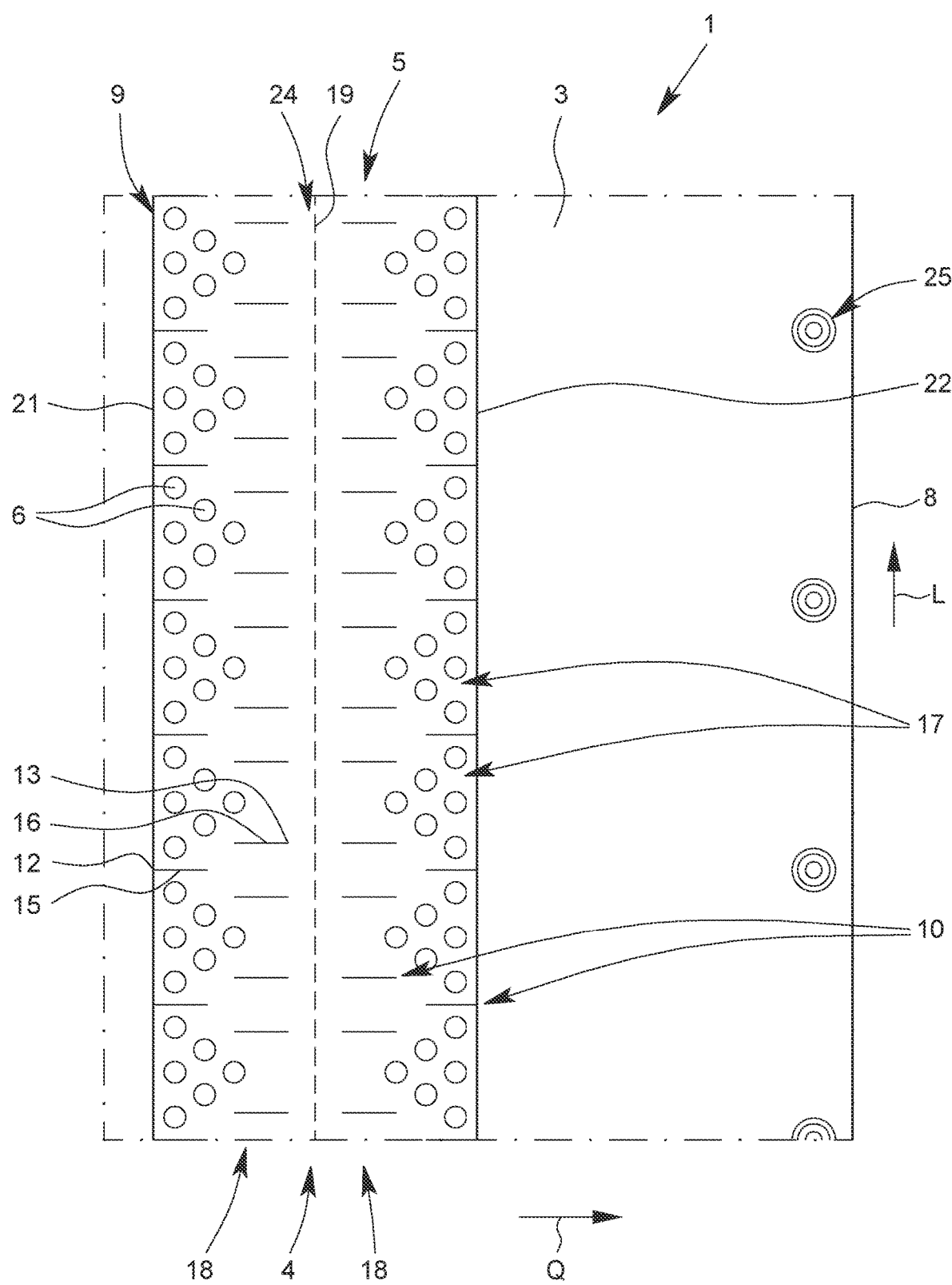

FIG. 2 shows that the weld start point 12 is the outermost weld point of the connection area 10 and faces the longitudinal edge 7. FIG. 2 further shows that the weld end point 13 is the outermost weld point of a connection area 10. However, this design does not necessarily have to be implemented.

The weld end point 13 is in any case further away from the longitudinal edge 7 than the weld start point 12.

Also, the weld start point 12 does not have to be the outermost weld point of a connection area 10, but it can be. The weld end point 13 can face the further longitudinal edge 8 of the basic film 3 opposite the longitudinal edge 7. Finally, the weld end point 13 is closer to the further longitudinal edge 8 than the weld start point 12.

The inclined arrangement between weld start point 12 and weld end point 13 can be used to ensure that the enclosed free space 11 tapers-especially towards separating line 19 of the sheet 1. In other words, this means that the free space 11 increases and/or widens towards the neighbouring longitudinal edge starting from separating line 19. A schematic illustration in perspective of the narrowing and/or expansion of the free space 11 can be seen especially in FIG. 11.

FIG. 1 shows that the line connecting the weld start point 12 with the weld end point 13 encloses an angle to the cross direction Q of at least 5°, preferably between 30° and 50°. In this context, it is understood that the above-mentioned angle may also depend on the fact which weld points of the connection area 10 are identified as weld start point 12 and weld end point 13.

For example, FIG. 2 shows that different weld points can be identified as weld start point 12 and weld end point 13. In the embodiment shown in FIG. 2, the outermost weld points of connection area 10 are finally weld start point 12 and weld end point 13. This is not necessarily the case, however. In particular, as a function of this, the above-mentioned angle depends on it, which is especially at least 5° in any case.

FIG. 1 shows that at least one connection area 10, especially all connection areas 10, comprises at least one welding 14 which is oblique, especially continuous, in relation to the cross direction Q running orthogonally to the longitudinal sheet direction L. In the illustrative embodiment shown in FIG. 1, at least two weldings 14 are provided for each connection area 10.

Figure 3:
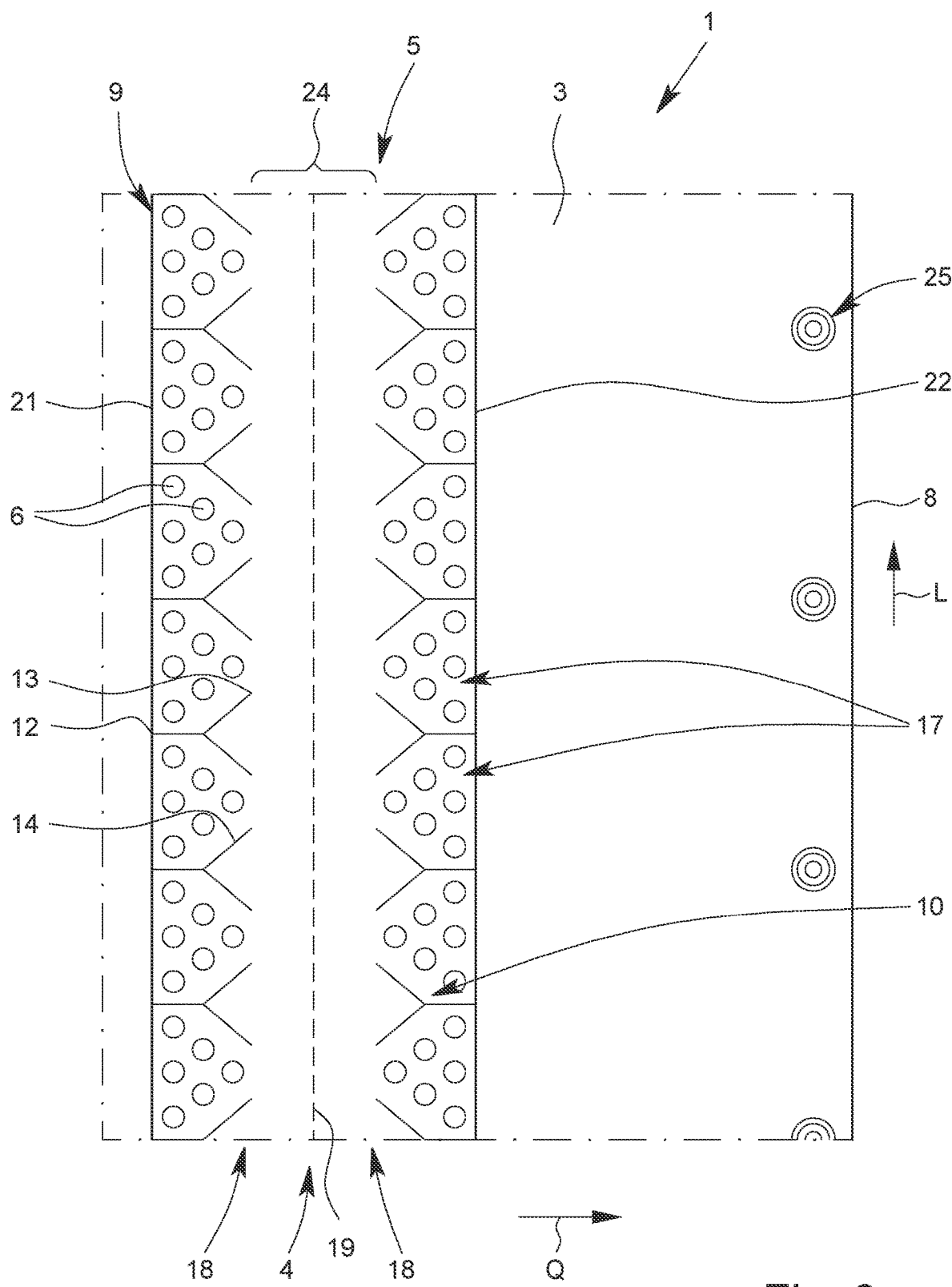
Figure 4:
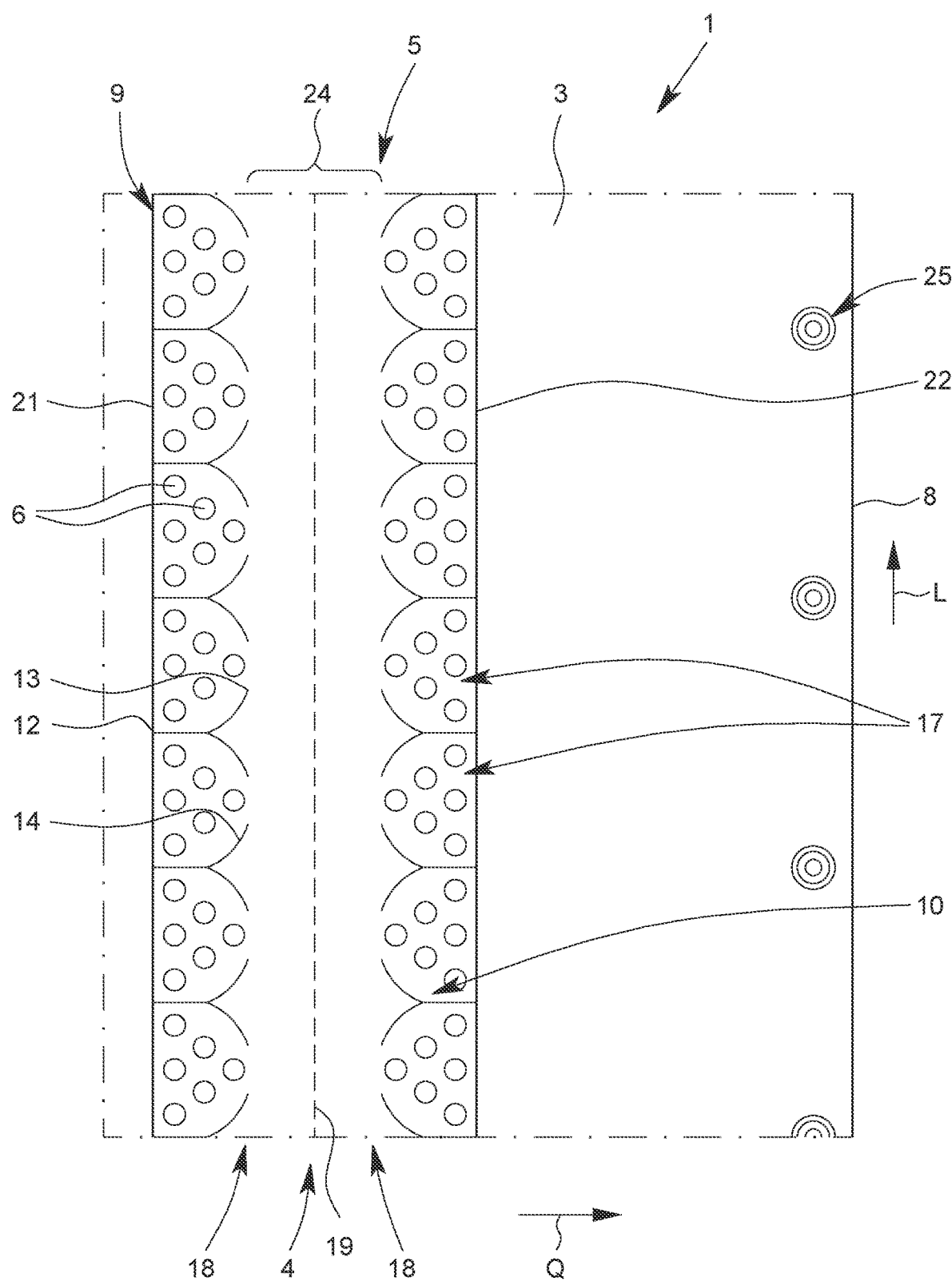

The weld start point 12 and the weld end point 13 can especially be located on the welding 14. This is shown schematically in FIG. 1 and FIGS. 3 to 5. The welding 14 can be designed straight as shown in FIG. 1 and FIG. 3 or curved as shown in FIG. 4. In the case of a curved design of the welding 14, it is especially intended that the welding 14 is designed at least essentially in the form of a curved section.

FIG. 2 shows a further embodiment in which no continuous welding 14 is realized. It is thereby provided that the weld start point 12 is arranged on a first welding line 15 and the weld end point 13 on a further welding line 16. The further welding line 16 is not only at a distance from the first welding line 15 in the illustrative example shown in FIG. 2, but is arranged offset and/or shifted to it-especially in relation to the longitudinal sheet direction L.

Furthermore, FIG. 2 shows that both the first and the further welding lines 15, 16 run at least essentially in cross direction Q of the sheet 1.

FIG. 1 shows that the cover film 9 extends continuously in the longitudinal sheet direction L and over the entire length of the basic film 3. Not shown is another embodiment in which the cover film 9 is designed to be continuous, but does not extend over the entire length of the basic film 3 in the longitudinal sheet direction L. Thus, the basic film may comprise 3 areas which do not include ventilation area 5. These areas do not have to be covered by the cover film 9—but they can be covered in other embodiments.

It is not shown that the cover film 9 can comprise individual sections which can especially attach one another and/or overlap one another. These individual sections of the cover film 9 can also be connected to the basic film 3 via connection areas 10.

FIG. 1 and FIG. 2 show that ventilation area 5 comprises a plurality of ventilation sections 17. The ventilation sections 17 are adjacent to each other and arranged one behind the other in the longitudinal sheet direction L. A ventilation section 17 may in particular contain a grouped arrangement of ventilation openings 6. A ventilation section 17 may include at least one ventilation opening 6. It is more preferably that all ventilation openings 6 and/or at least substantially all ventilation openings 6 are arranged in ventilation sections 17. In any case, at least 80% of the ventilation openings 6 are arranged in ventilation sections 17.

Furthermore, FIG. 1 shows that in each case and/or at least one connection area 10 is arranged between neighbouring ventilation sections 17. In the illustrative example shown in FIG. 1, neighbouring ventilation sections 17 are separated from each other by connection areas 10. Thereby each connection area 10 can comprise the weld start point 12 and the weld end point 13. The connection areas 10 as well as the ventilation sections 17 can be designed at least essentially identically or can differ from each other.

In the embodiment shown in FIG. 1, a regular and repetitive sequence of connection areas 10 and ventilation sections 17 is provided, running in the longitudinal sheet direction L.

FIGS. 1 and 3 show that the weldings 14 are designed to be inclined and/or sloping towards the immediately neighbouring ventilation section 17. In addition, two weldings 14 are provided in one connection area 10. Thereby the welding 14 inclined towards the directly neighbouring and/or adjacent ventilation section 17 is closer to the ventilation section 17 in question than the other welding 14 of the same connection area 10.

In the illustrative example shown in FIG. 2, it is also provided that the line connecting the weld start point 12 with the weld end point 13 is designed to be inclined and/or oblique towards the immediately neighbouring ventilation section 17. In the embodiment shown in FIG. 2, it is provided that in particular at least two lines can be formed by at least two weld end points 13, which, however, particularly refer to the same weld start point 12.

Figure 11:
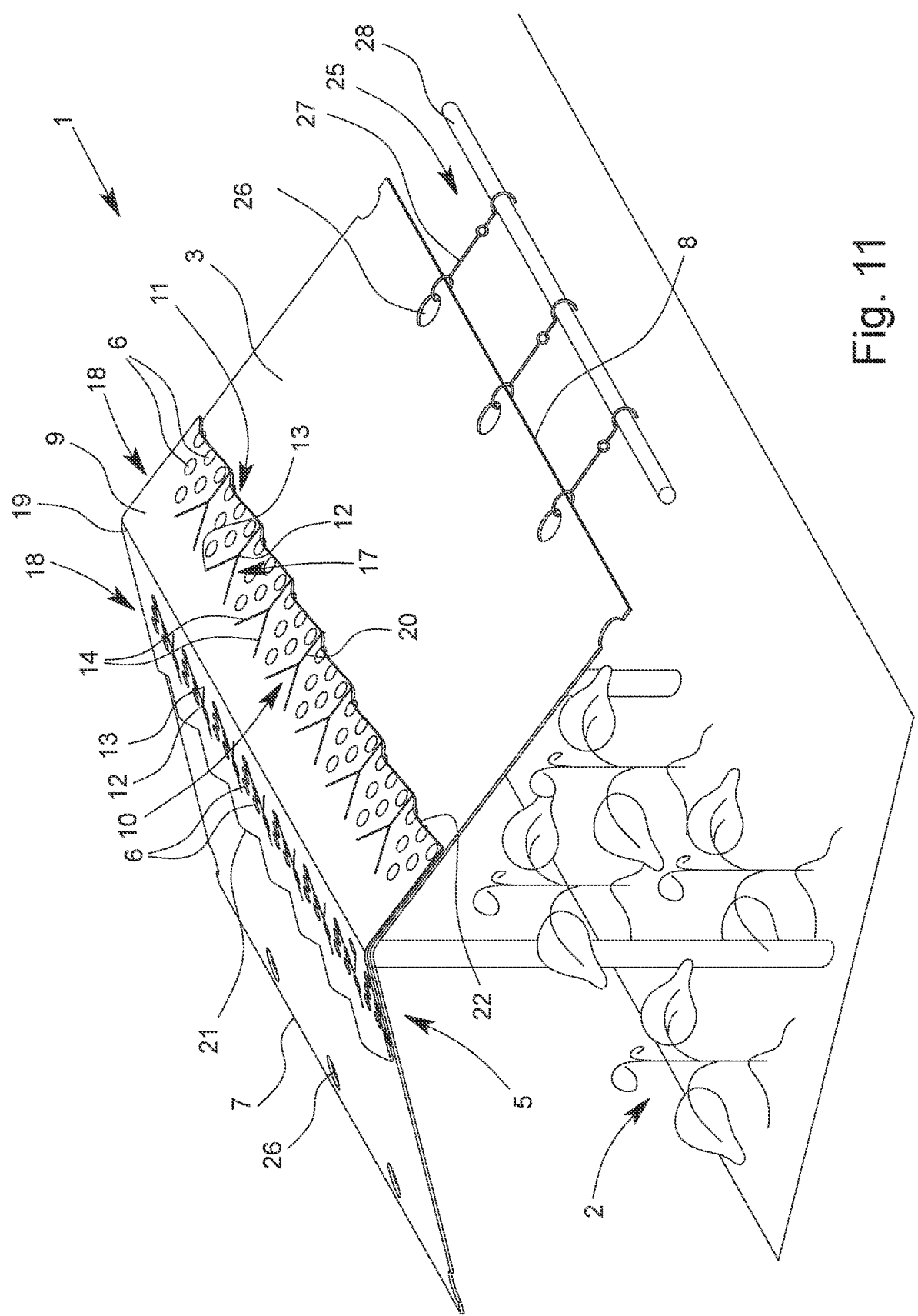

FIG. 11 shows that the free spaces 11 are each provided above a ventilation section 17 and the connection areas 10 are designed in such a way that the respective free space 11 tapers towards a longitudinal edge 7, 8 of the sheet. Thus, the free space 11 tapers especially towards the side facing away from the opening of the free space 11 and/or the longitudinal edge 7, 8 facing away from the opening of the free space 11. Finally, the ventilation can take place via the opening of the free space 11.

The free space 11 can especially be formed over a ventilation section 17 in such a way that the length of the basic film 3 running in the longitudinal sheet direction L is smaller than the length of the cover film 9 running in the longitudinal sheet direction L. The length of the cover film 9 can refer to the "pulled out" state. The greater length of the cover film 9 compared to the basic film 3 results in a curvature of the cover film 9 over the ventilation section 17. The difference in length between the basic film 3 and the cover film 9 thus creates the free space 11 between the basic film 3 and the cover film 9. Especially, the cover film 9 is designed in its original state, not yet bonded to the basic film 3, to be at least 20% longer than the length of the covered area of the basic film 3.

FIG. 1 shows that the ventilation area 5 comprises two ventilation segments 18 which are opposite each other at least in some areas. The ventilation segments 18 can especially each comprise a plurality of ventilation sections 17. In the illustrative example shown in FIG. 1, it is provided that the ventilation segments 18 are designed mirror-symmetrically to a mirror axis running parallel to the longitudinal sheet direction L. In other designs, the mirror symmetry axis can also be formed by further axes.

In the embodiment shown in FIG. 11, one ventilation segment 18 forms a side surface of the gable roof. The ventilation segments 18 are finally separated from each other by a separating line 19. The separating line 19 can be the centre line of the basic film 3 and/or the sheet 1. In other embodiments it may also be provided that the separating line 19 is defined by the axis resulting from the support of sheet 1 on a rope, bar or the like. For example, the separating line 19 can be defined by an axis of support. The separating line 19 need not be a physical line, fold or the like, it can be an imaginary axis.

In addition, the separating line 19 can also be the axis of symmetry for the mirror-symmetrical design of the ventilation segments 18. The separating line 19 can coincide with the centre line of the basic film 3—but does not have to.

In particular, both ventilation segments 18 are arranged in the central area 4 of the basic film 3.

The welding 14 or the welding lines 15, 16 can comprise different lengths as a function of the intended use. In particular, it is intended that the welding 14 and/or the first and/or further welding lines 15, 16 extend over at least 10%, especially between 30% and 80%, of the width of a ventilation section 17 running in cross direction Q and/or the width of the ventilation area 5 and/or the width of the ventilation segment 18. The widths of the above-mentioned areas refer especially to the width extending at least substantially in the cross direction Q.

In further embodiments, it may also be provided that the welding 14 and/or the first and/or further welding lines 15, 16 comprise a length of at least 10%, especially between 30% and 80%, of the width of a ventilation section 17 and/or width of the ventilation area 5 and/or width of the ventilation segment 18.

The length of welding 14 and/or of weld lines 15, 16 may refer to the total length which can be determined independently of the longitudinal sheet direction L and/or cross direction Q.

It is not shown that the welding 14 and/or the first and/or further welding lines 15, 16 are designed to be interrupted.

FIG. 1 shows that immediately neighbouring weldings 14 design a V-shape, at least in some areas. Thereby the respective legs of the V-shape, which are designed by the respective welding 14, can pass directly into each other to form a pointed corner of the V-shape or be spaced from each other. In the illustrative example shown in FIG. 1, it is intended that the pointed corner of the V-shape is designed.

Even if the weldings 14 are curved, a V-shape is designed between immediately neighbouring weldings 14 of a connection area 10—as shown schematically in FIGS. 4 and 5.

In addition, it may be provided that the connection area 10 includes a further welding 20 next to welding 14 or next to the first and/or further welding lines 15, 16. The further welding 20 can be at least essentially aligned in cross direction Q, as shown in FIG. 1 and FIGS. 3 to 5. The further welding 20 can merge into the weldings 14 of the connection area 10 or be at a distance from them.

Provided that the further welding 20 runs at least essentially in the cross direction Q, a V-shaped arrangement of neighbouring weldings 14 can especially enable a Y-shaped design of the connection area 10. A Y-shaped design is also understood to be one in which the further welding 20 is at a distance from the weldings 14, as shown in FIGS. 1 and 5.

Finally, FIGS. 1 and 3 to 5 show a Y-shaped design of the connection area 10, in which a further welding 20 interacts with the V-shape formed by the weldings 14.

It is not shown, that in further embodiments the further welding 20 can be inclined or straight and/or at least substantially parallel with respect to the cross direction Q. Alternatively or additionally, the further welding 20 can also be curved—at least partially.

FIGS. 1 and 2 show that the weld end point 13 can face the separating line 19. The weld start point 12 can especially face away from the separating line 19 and be arranged closer to a further longitudinal edge 8 of the basic film 3 and/or a longitudinal edge 22 of the cover film 9. The longitudinal edge 22 of the cover film 9 can especially be turned towards the further longitudinal edge 8 of the basic film 3. Especially, the free space 11 can be tapered towards the separating line 19.

The weldings 14 can also be arranged especially in the upper area of the respective ventilation segments 18 facing the separating line 19. Alternatively or additionally, it may be provided that the further welding 20 is arranged in the lower area of the ventilation segments 18 facing away from the separating line 19.

It can especially be provided that the opposite connection areas 10 of the respective ventilation segments 18 are designed to be at least essentially mirror-symmetrical. The separating line 19 and/or the centre line of the basic film 3 can be the mirror axis. Especially, the mirror axis runs at least essentially parallel to the longitudinal sheet direction L—at least in other embodiments.

In addition, the further welding 20 can be designed to be straight or curved as a whole or in certain areas. In the illustrative example shown, the further welding 20 is designed to be at least essentially straight and in cross direction Q.

FIGS. 1 and 2 and FIG. 5 show illustrative examples in which the connection area 10 comprises an intermediate ventilation channel 23. The intermediate ventilation channel 23 can especially be formed by a distance between the weldings 14 and the further welding 20. In the illustrative example shown in FIG. 2, the intermediate ventilation channel is finally formed by the spacing between the first and further welding lines 15, 16.

Furthermore, the further welding 20 can be provided in other embodiments in such a way that it extends over at least 5% of the width of a ventilation section 17 and/or the width of a ventilation area 5 and/or the width of a ventilation segments 18. Alternatively or additionally, it can be provided that the length, which can be independent of the longitudinal sheet direction L and/or the cross direction Q, of the further welding 20 corresponds to at least 5%, especially between 10% and 50%, of the width of a ventilation section 17 and/or the width of a ventilation area 5 and/or the width of a ventilation segments 18.

As explained above, it is especially intended that the width of the cover film 9 should be smaller than the width of the basic film 3. In addition, it may also be provided that the cover film 9 overlaps the ventilation area 5, especially on both sides, and especially serves to cover the ventilation openings 6.

In other embodiments, it may be provided that the width of the cover film 9, which extends particularly in the cross direction Q, corresponds to a maximum of 50%, especially a maximum of 30%, of the width of the basic film 3.

FIG. 11 shows in a schematic illustration that the cover film 9 lies on the basic film 3 in the area of a connection area 10, at least in some areas. Especially in the area of the connection area 10, the cover film 9 lies at least essentially tight and/or flat on the basic film 3. Preferably, the cover film 9 can also rest on the basic film 3 between the directly neighbouring weldings 14 of the respective connection area 10.

FIG. 3 shows that a central transition area 24 covered by the cover film 9 is provided between the ventilation segments 18. This transition area 24 can be designed free of welding(s) or welding sections and/or free of ventilation openings 6.

FIG. 11 shows that this transition area 24 can be used to rest on a tension cable or bar of a frame. An air exchange between the opposite ventilation sections 17 of the respective ventilation segments 18 can (but does not have to) be made possible via the transition area 14 in other embodiments.

In the illustrative example shown, it is intended that a ventilation section 17 comprises a plurality of ventilation openings 6. In particular between 3 and 10, especially 4 to 6, ventilation openings 6 are provided per ventilation section 17. The ventilation openings 6 can be arranged in rows. Preferably, the number of ventilation openings 6 may be reduced in the successive rows of a ventilation section 17, especially towards separating line 19. For example, the lowest row of the ventilation section 17 facing the nearest longitudinal edge 22 of the cover film 9 may comprise between 3 and 5 ventilation openings 6. For example, there may be between 3 to 6 rows. For example, the topmost row of ventilation section 17 facing away from the longitudinal edge 22 may have 1 to 2 ventilation openings 6.

FIG. 3 shows that the area of the ventilation section 17 belonging to the basic film 3, and/or the area it occupies between neighbouring connection areas 10, preferably on both sides, tapers towards separating line 19. This taper is also further illustrated by the decreasing number of ventilation openings 6 in the rows.

In this context it is obvious that the ventilation openings 6 can be designed as breakthroughs of the basic film 3.

FIG. 11 shows that the basic film 3 can comprise fastening means 25 on its longitudinal edges 7, 8. In the illustrative example shown, the fastening means 25 are formed by an opening 26 in the basic film 3 and by a hook 27 engaging in the opening 26. The hooks 27 can be fastened, for example, to a frame or to the support means 28. Such a support means 28 is also shown in a schematic illustration in FIG. 11. The support means 28 can be connected to the floor and/or supported by it.

It is not shown that neighbouring sheets 1 can also be connected to each other via fastening means 25 and preferably connected directly to each other—for example via hooks 27. As an alternative to hooks, for example, a tension belt or a tension cable is also possible.

It is not shown that the basic film 3 and/or the cover film 9 is/are designed to be at least partially, preferably completely, translucent and/or transparent. Light transmission is especially intended for visible light and/or daylight, preferably in a wavelength range between 400 nm and 700 nm.

In other embodiments, a thermoplastic material can be provided as the material for the cover film 9 and/or the basic film 3. Especially, the cover film 9 and/or the basic film 3 can be made of the thermoplastic material. The thermoplastic material can be a polyolefinic material, preferably polyethylene, soft polyethylene, linear low density polyethylene, ethylene-butyl-acrylate copolymer, ethylene-vinyl acetate and/or mixtures thereof.

It is not shown that the basic film 3 comprises a width of between 0.5 m and 40 m, especially between 1.5 m and 15 m. The width of the basic film 3 can be varied as a function of the intended use, for example for greenhouses or for covering vines and/or soft fruit.

The cover film 9 can comprise a width of at least 10 cm, especially between 0.4 m and 1.0 m.

In addition, the sheet 1 can be supplied rolled up and comprise a length of between 10 m and 800 m.

It is not shown that the basic film 3 and/or the cover film 9 is/are designed to be breathable. Especially the cover film may comprise 9 micro-perforations, which may lead to a better air circulation, especially to an improved ventilation of the covered area.

Furthermore, heat-absorbing additives can be added to the material of the cover film 9. This also improves the air circulation.

FIG. 11 schematically shows the use of a sheet 1 according to one of the embodiments described earlier in the agricultural sector. The sheet 1 is preferably used to cover cultivated plants 2, as shown in FIG. 11. The use of the sheet 1 is especially for protection against rain and/or weather and/or for ventilation of the covered area.

Figure 30:
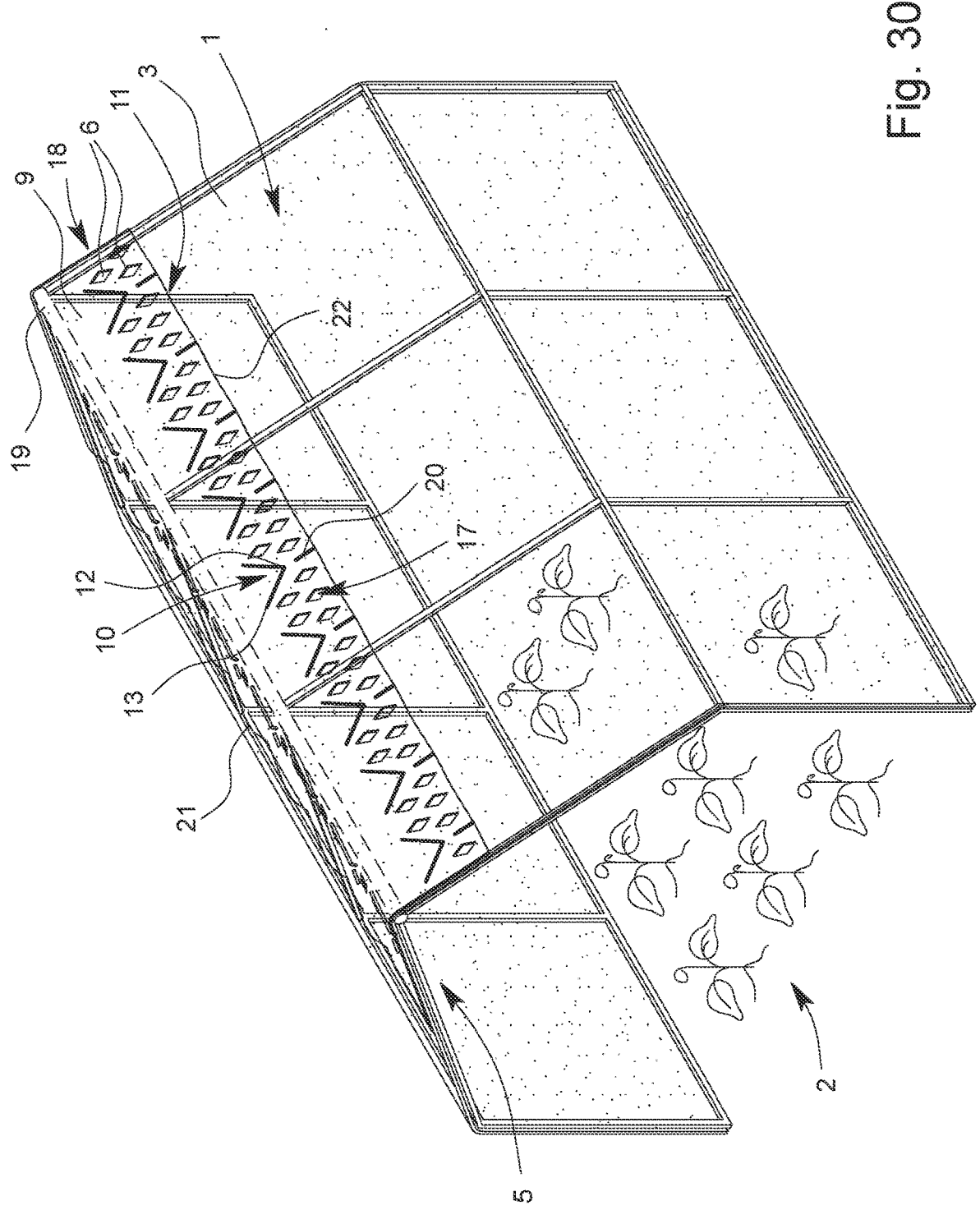
Figure 31:
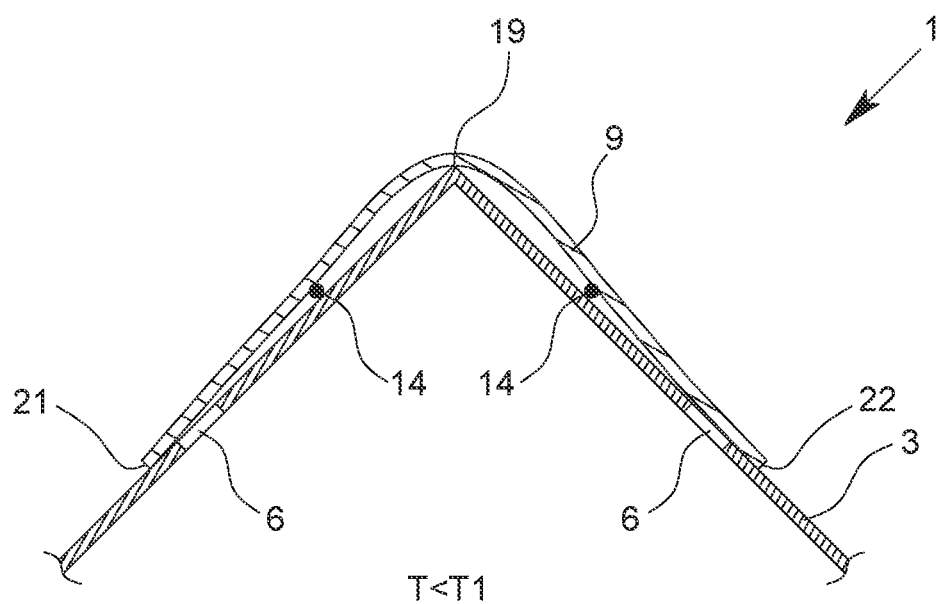
Figure 32:
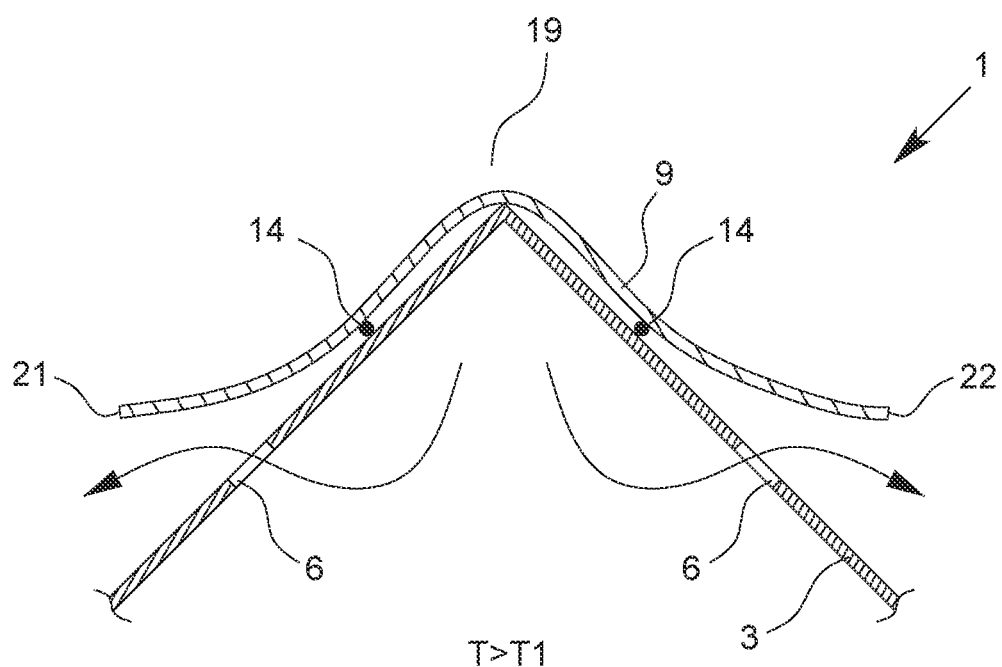
Figure 33:
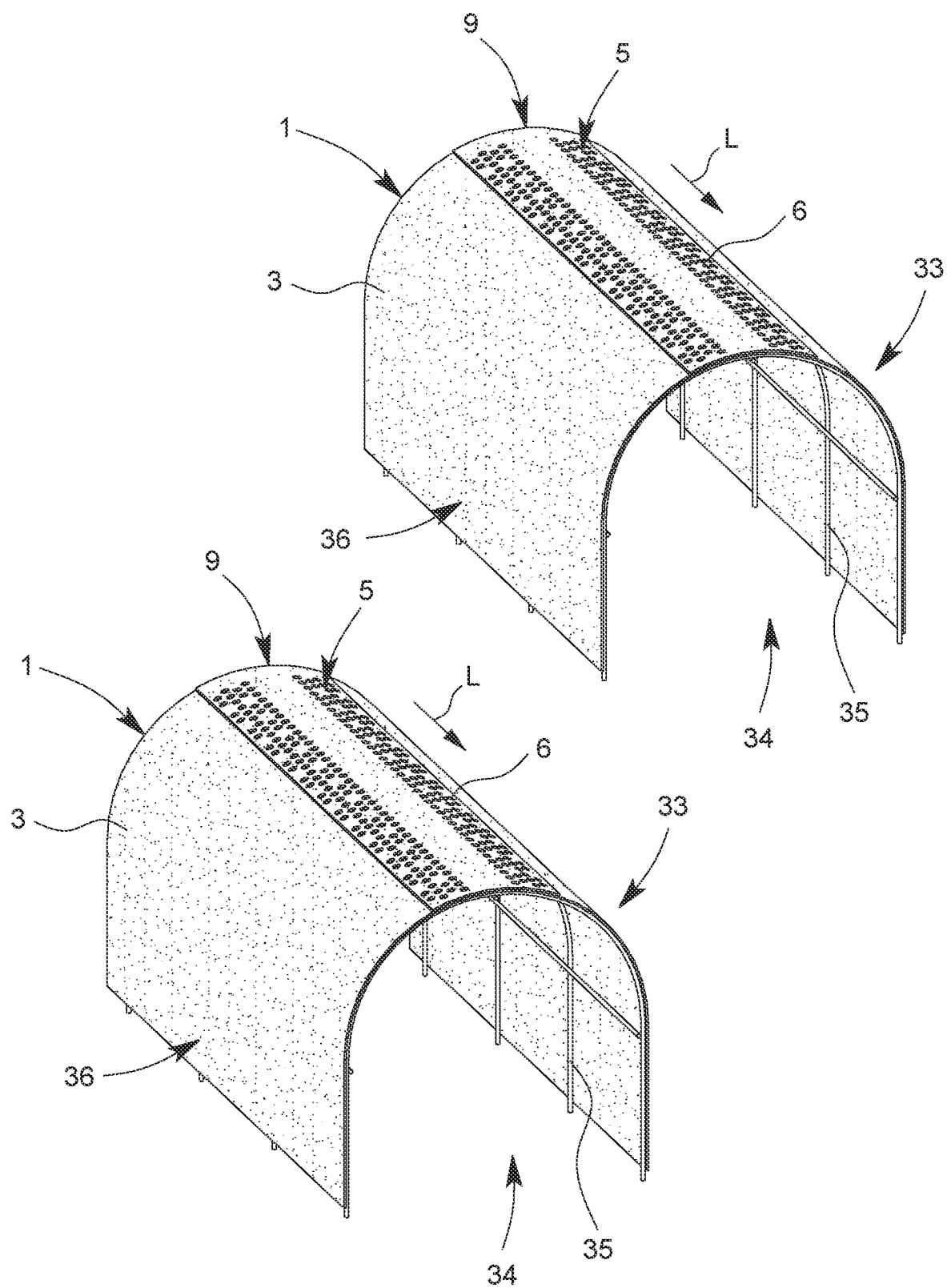
Figure 34:
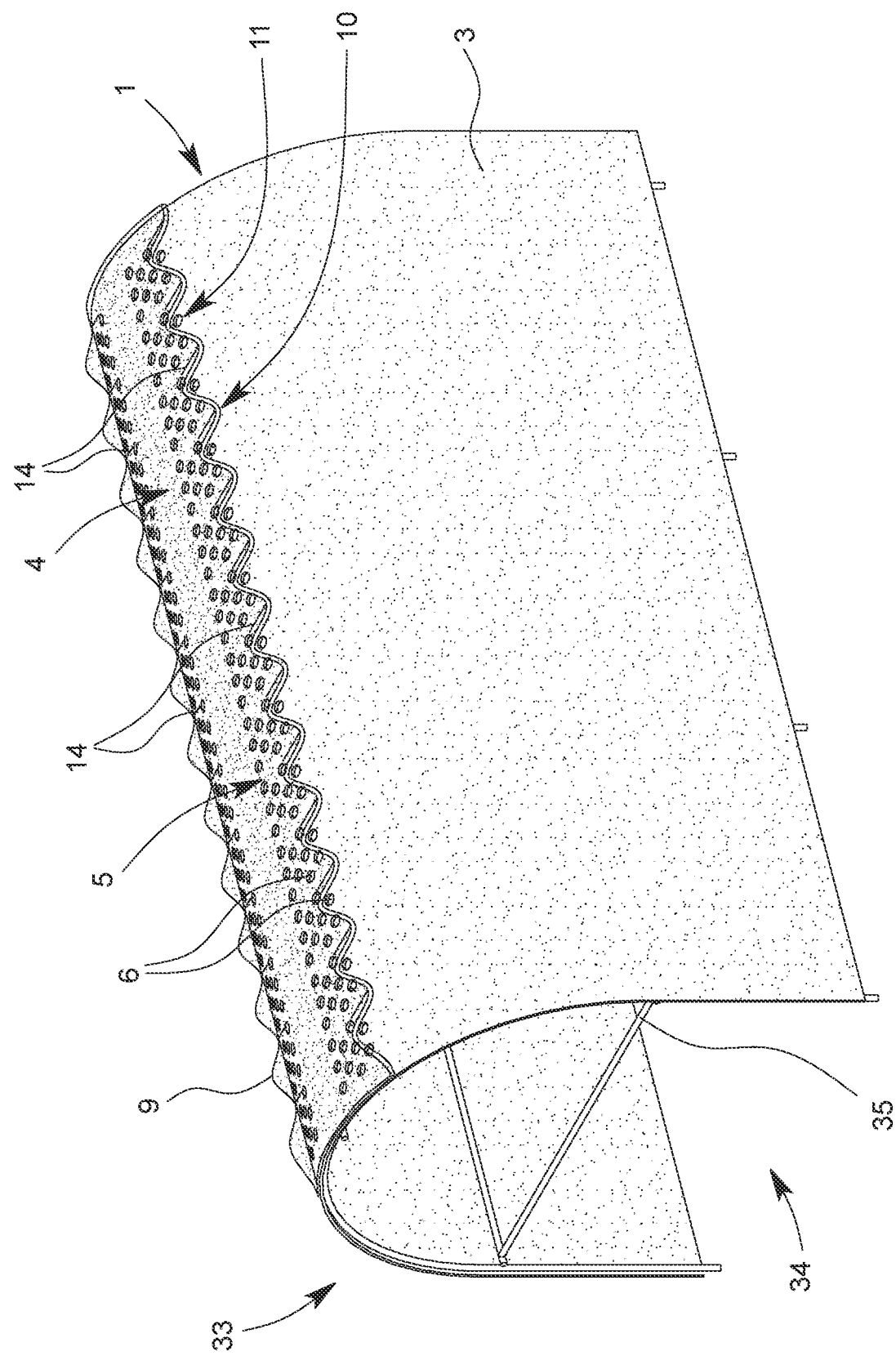
Figure 35:
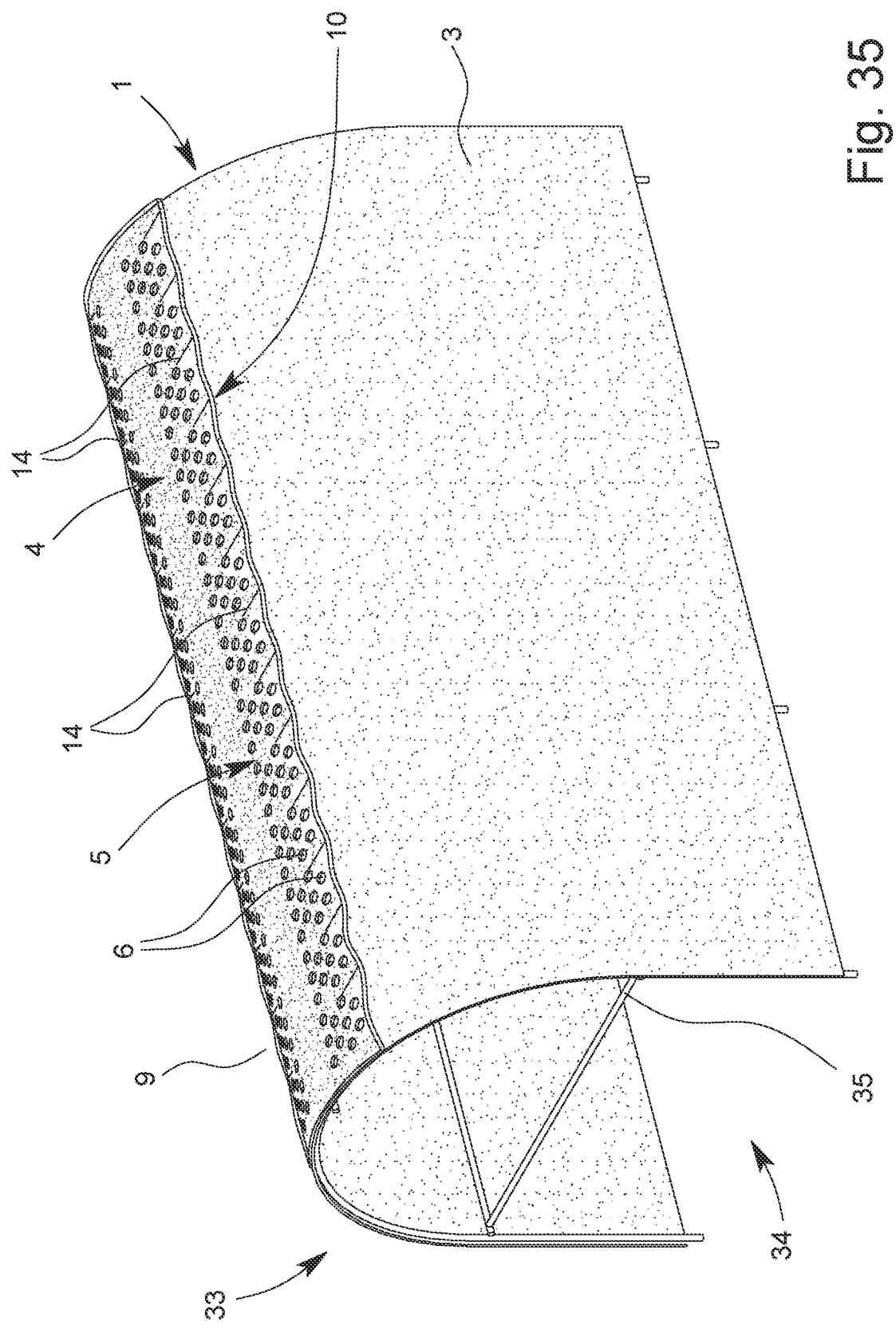
Figure 36:
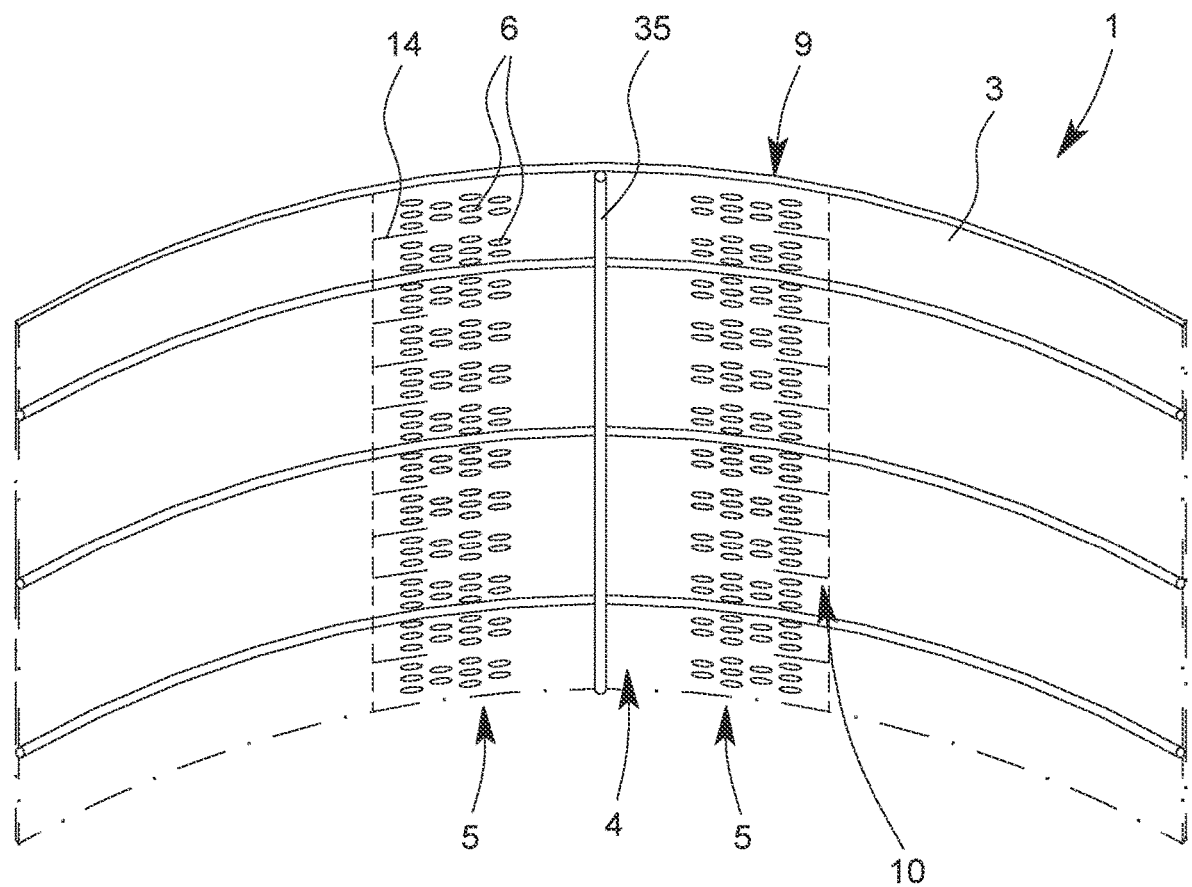

FIG. 30 shows, that the sheet 1 can be used in greenhouses, preferably as external cover.

The following describes a further form of execution which can also be realized on its own, i.e. without the oblique and/or sloping weldings described earlier, and which has its own inventive significance. It is understood in this context that the features, characteristics or advantages described earlier also apply in the same way to the embodiment described below, without this requiring further explicit mention.

At the same time, the features or characteristics described below can also be applied to the embodiments described earlier without the need for further explicit mention.

Figure 12:
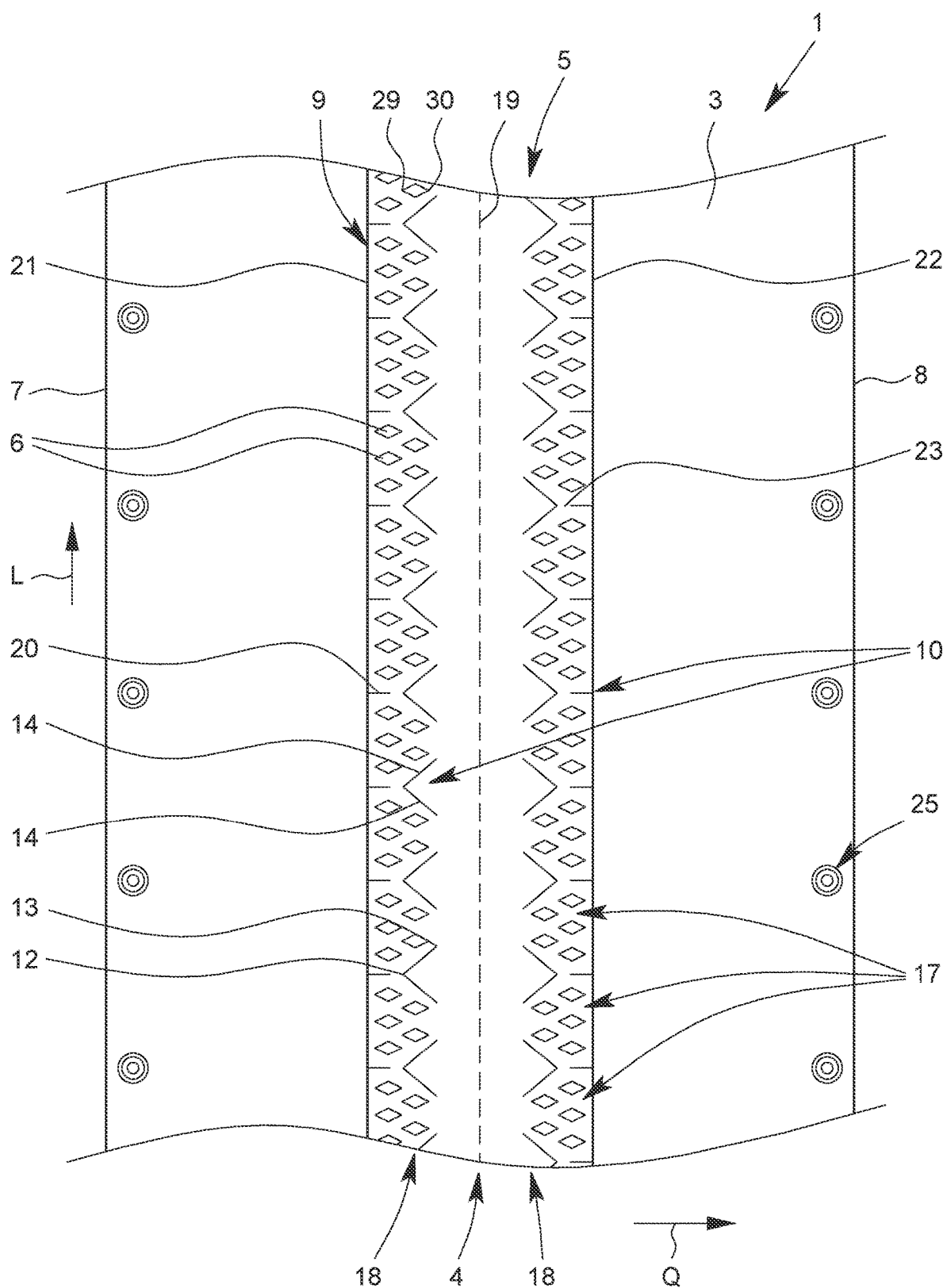

FIG. 12 shows an elongated sheet 1 for covering cultivated plants 2 with a basic film 3 made of plastic.

In the central area 4 of the basic film 3 there is a ventilation area 5 extending in the longitudinal sheet direction L, which can be used to ventilate the covered area when the sheet 1 is in use. The ventilation area 5 comprises a plurality of ventilation openings 6.

FIG. 12 also shows that two opposite corners 29, 30 of at least one ventilation opening 7 are provided in the cross direction Q of sheet 1, which runs at least substantially orthogonally to the longitudinal sheet direction L.

The at least one ventilation opening 7 may comprise further corners. Directly opposite further corners may, for example, be arranged at least substantially in the longitudinal sheet direction L, as shown in FIG. 12.

The opposite corners 29, 30 are especially arranged in such a way that the line connecting the opposite corners 29, 30 runs at least essentially in cross direction Q.

The line connecting the corners 29, 30 can also be designed to be (slightly) inclined in relation to the cross direction Q and, in particular, can form a first angle to the cross direction of maximum+/−45°, even more preferably maximum+/−30° and especially maximum+/−10°. In this context, it is understood that the first angle is between the line connecting the opposite corners 29, 30 and the cross direction Q and refers especially to the smaller angle included. Finally, there is also a further angle, which is 180° minus the size of the first angle.

The corners 29, 30 can especially be arranged in such a way that the ventilation opening 6 does not comprise any further corner or any further section or area which protrudes opposite the respective corner 29, 30—in relation to the respective immediately neighbouring longitudinal edge 7, 8 of the basic film 3. Especially no further corner or further section/area of the ventilation opening 6 is closer to the respective immediately adjacent longitudinal edge 7, 8 of the basic film 3. Such an overhang would in particular mean that if the sheet 1 is pulled in the cross direction Q with a tensile force, this overhanging area would first hit a tension cable or bar of a frame, for example.

In the end, sheet 1 is pulled in the state of use, especially in the cross direction Q, onto a tension cable, bar or the like. The tensile force thereby acts mostly at least essentially in the cross direction Q.

Thus, the corners 29, 30 can form the outermost boundary points of the ventilation opening 6 in relation to the respective immediately neighbouring longitudinal edge 7, 8 of the basic film 3.

FIGS. 13 to 24 show different embodiments of possible forms of the ventilation opening 6 apart from the circular form which is shown in several embodiments. Each of the forms may be used in each shown and claimed embodiment, respectively-alone or in combination with one or more other forms.

In the embodiments shown in FIGS. 13 to 24 the cross direction Q is (schematically) drawn in. This serves as a schematic illustration of the orientation of the ventilation opening 6 on/in the basic film 3.

Figure 22:
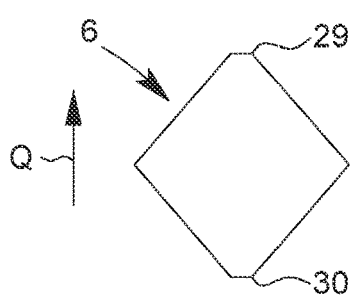

In the illustrative example shown in FIG. 22 it is provided that further corners 31 are at least essentially aligned with the respective neighbouring corner 29, 30 and/or are at a height to this in relation to the cross direction Q.

However, it is preferred if the corners 29, 30 form the outermost boundary points to the respective adjacent longitudinal edge 7, 8 of the basic film 3 and/or no further section/area and/or no further corner 31 is aligned with the respective corner 29, 30, is at the same height in relation to the cross direction Q or protrudes beyond it, especially in relation to the respective immediately adjacent longitudinal edge 7, 8 of the basic film 3.

Figure 13:
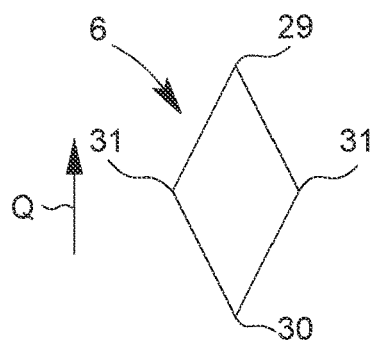

FIG. 13 shows that the opposite corners 29, 30 are designed to be at least essentially pointed and/or end in a point whose apex may also comprise a curve with a small radius.

Figure 21:
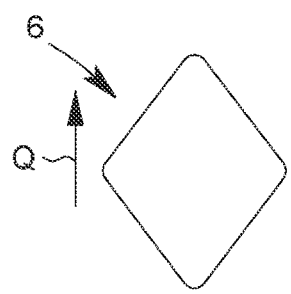

FIG. 21 shows schematically that the opposite corners 29, 30 can also be designed with a rounded edge.

The design shown in FIG. 12 also provides that a plastic cover film 9 running in the longitudinal sheet direction L of the basic film 3 is applied to the ventilation area 5, forming free spaces 11 for air exchange, and is firmly welded to the basic film 3 over a plurality of connection areas 10 following one another in the longitudinal sheet direction L.

Above this, it is particularly preferred if the ventilation opening 6 comprises a design that is at least substantially elongated in the cross direction Q. An elongated design is especially understood to mean that the length running in the cross direction Q is greater than the width of the ventilation opening 6 running in the longitudinal sheet direction L.

FIG. 13 shows that the ventilation opening 6 is designed as a rhombus.

In addition, the ventilation opening may comprise 6 straight or curved outer borders, as shown schematically in FIGS. 13 to 24.

Figure 14:
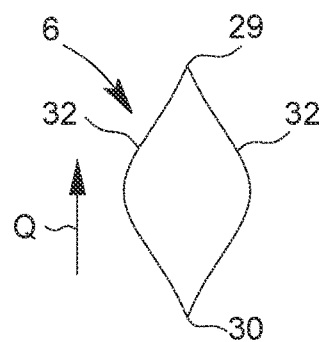

FIG. 14 shows a ventilation opening 6 with opposite pointed corners 29, 30, wherein the outer borders connecting the corners 29, 30 are designed 32 curved.

Figure 15:
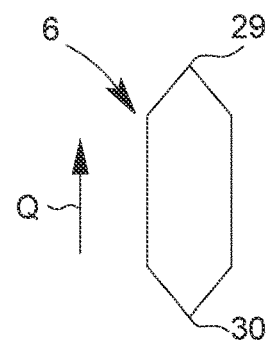
Figure 16:
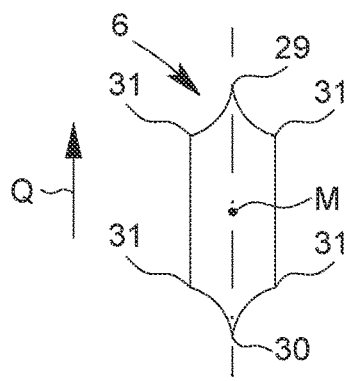

FIG. 15 and FIG. 16 each show a ventilation opening 6 designed as a hexagon, wherein the design shown in FIG. 15 has at least essentially straight outer boundary edges. In the design shown in FIG. 16, the legs of the outer boundary immediately adjacent to the corners 29, 30 are designed to be at least essentially in the shape of sections of an arc.

Figure 17:
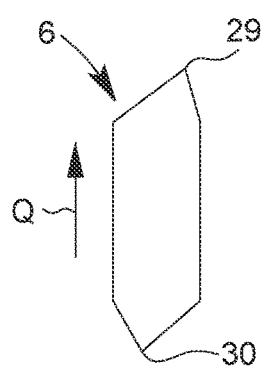
Figure 18:
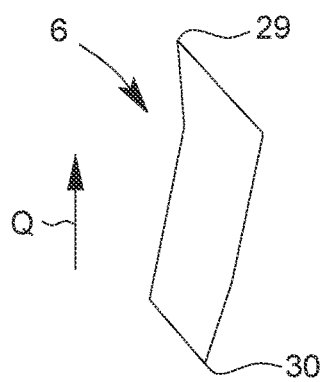

FIGS. 17 and 18 each also show a ventilation opening 6 designed as a hexagon, which especially is neither symmetrical nor rotationally symmetrical.

In other designs it may be provided that the ventilation opening 6 is designed to be mirror-symmetrical at least to at least one mirror axis.

Alternatively or in addition, other embodiments may provide for the ventilation opening 6 to be designed to be rotationally symmetrical.

Figure 19:
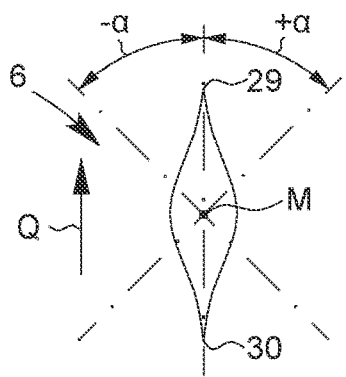
Figure 20:
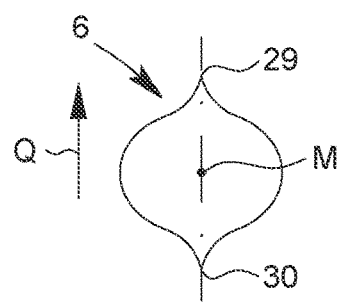

FIGS. 19 and 20 show ventilation openings 6 of different widths.

Figure 23:
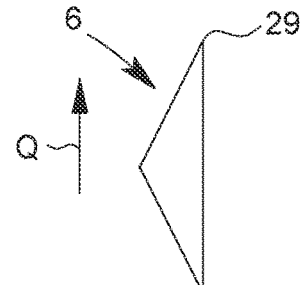

FIG. 23 shows an isosceles, obtuse triangle-shaped ventilation opening 6.

Figure 24:
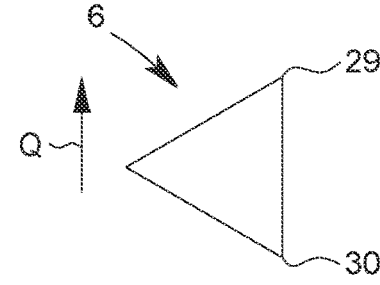

FIG. 24, however, shows a ventilation opening 6 in the form of an equilateral triangle.

It is particularly preferred if the opposite corners 29, 30 are arranged not offset to each other in relation to the cross direction Q. A staggered and/or shifted arrangement, as schematic illustration in FIG. 17, can also be provided in principle.

FIG. 19 shows schematically that the ventilation opening 6 comprises only the opposite corners 29, 30 as outer corners at an angle α starting from the line connecting the opposite corners 29, 30 of at least +/−45°, preferably of at least +/−80°. The centre point M of the ventilation opening 6 thereby serves as the starting point for the above-mentioned determination of the angle.

Preferably, the ventilation opening 6 comprises a maximum length of at least 1 mm, especially between 4 mm and 80 mm. The length of the ventilation opening 6 is aligned in the cross direction Q, especially in the state of use.

The ventilation opening 6 can comprise a maximum width of at least 0.5 mm.

In addition, other designs may also provide that the ventilation opening 6 comprises an area of at least 0.01 cm$^2$, especially between 1 cm$^2$ and preferably 3 cm$^2$.

Furthermore, the opposite corners 29, 30 shown in the afore-mentioned illustrative examples each comprise an angle of at least 10°. Especially this angle is between 30° and 90°.

A further execution example is described below. It is understood in this context that the features, characteristics or advantages described earlier also apply in the same way to the design described below, without this requiring further explicit mention.

At the same time, the features or characteristics described below can also be applied to the designs described earlier without the need for further explicit mention.

In the case of an even more preferably even independently realizable execution example, i.e. without oblique weldings and/or without ventilation openings 6 having the corners 29, 30, an elongated sheet 1 is provided for covering cultivated plants 2. The elongated sheet 1 comprises a basic film 3 made of plastic. Especially the sheet 1 is designed according to one of the previous designs.

In the central area 4 of the basic film 3 a ventilation area 5 extending in the longitudinal sheet direction L is provided with a plurality of ventilation openings 6. A plastic cover film 9, extending in the longitudinal sheet direction L of the basic film 3, is applied on the ventilation area 5 in such a way that free spaces 11 for air exchange are formed. The cover film 9 is firmly welded to the basic film 3 over a plurality of connection areas 10 consecutive in the longitudinal sheet direction L.

With this sheet 1, it is then provided that the sum of the areas of all ventilation openings 6 is at least 1%, especially between 1.1% and 3%, of the total area of the basic film 3.

Further aspects of the present invention which are realizable independently and/or in combination with the aspects and features described before are especially:

1. Elongated sheet (1) for covering cultivated plants (2), with a basic film (3) of plastic, wherein a ventilation area (5) extending in the longitudinal sheet direction (L) and having a plurality of ventilation openings (6) is provided in the central area (4) of the basic film (3), wherein at least one ventilation opening (6) comprises two opposite corners (29, 20) of the ventilation opening (6) in a cross direction (Q) of the sheet (1) extending at least substantially orthogonally to the longitudinal sheet direction (L).

2. Sheet according to aspect 1, characterized in that the opposite corners (29, 30) are arranged in such a way that the line connecting the opposite corners (29, 30) runs at least substantially in the cross direction (Q) and/or in that the line connecting the opposite corners (29, 30) encloses a first angle to the transverse direction (Q) of at most+/−45°, even more preferably at most+/−30° and especially at most+/−10°, and/or in that the opposite outer corners (29, 30) are arranged in such a way that the ventilation opening (6) comprises, in relation to the respective immediately adjacent longitudinal edge (7, 8) of the basic film (3), no further corner or no further region which projects with respect to the respective outer corner (29, 30) and/or is aligned with the latter.

3. Sheet according to aspect 1 or 2, characterized in that the opposite corners (29, 30) are each designed to be pointed or rounded.

4. Sheet according to one of the aspects 1 to 3, characterized in that the ventilation opening (6) comprises a design which is elongated at least substantially in cross direction (Q).

5. Sheet according to one of the aspects 1 to 4, characterized in that the ventilation opening (6) is at least substantially rhombus-shaped.

6. Sheet according to one of the aspects 1 to 5, characterized in that the ventilation opening (6) comprises a maximum length of at least 1 mm, preferably between 2 mm to 200 mm, more preferably between 4 mm to 80 mm, and/or that the ventilation opening (6) comprises a maximum width of at least 0.5 mm, preferably between 1 mm to 100 mm, more preferably between 2 mm to 40 mm.

7. Sheet according to one of the aspects 1 to 6, characterized in that the corner (29, 30) forms an angle of at least 10°, preferably between 20° to 100°, more preferably between 30° to 90°.

8. Sheet according to one of the aspects 1 to 7, characterized in that a cover film (9) of plastic, running in the longitudinal direction of the basic film (3), is applied to the ventilation area (5) in such a way that free spaces (11) for an air exchange are formed, wherein the cover film (9) is firmly welded to the basic film (3) over a plurality of connection areas (10) following one another in the longitudinal sheet direction (L).

9. Sheet according to one of the aspects 1 to 8, characterized in that the connection area (10) is designed to be inclined, at least in some areas, with respect to a weld start point (12) and a weld end point (13) with respect to the cross direction (Q) running orthogonally to the longitudinal sheet direction (L), especially wherein the line connecting the weld start point (12) with the weld end point (13) encloses an angle to the transverse direction (Q) of at least 5°, preferably between 5° and 70°, even more preferably between 30° and 50°.

10. Sheet according to one of the aspects 1 to 9, characterized in that the ventilation area (5) comprises a plurality of neighbouring ventilation sections (17) arranged one behind the other in the longitudinal sheet direction (L), wherein at least one ventilation section (17) comprises at least one ventilation opening (6), in particular wherein in each case and/or at least one connection area (10) is arranged between neighbouring ventilation sections (17) and/or in particular wherein one ventilation section (17) is enclosed by at least two connection sections (10) and/or weldings (14).

11. Sheet according to one of the aspects 1 to 10, characterized in that the ventilation section (17) comprises a plurality of ventilation openings (6), preferably at least substantially identically formed, in particular between 2 to 30, preferably between 3 to 10, in particular wherein the ventilation openings (6) are arranged in rows, preferably in rows running parallel to the longitudinal sheet direction (L).

12. Sheet according to one of the aspects 1 to 11, characterized in that the basic film (3) has a width of between 0.5 to 40 m, preferably between 1 to 20 m, preferably between 1.5 to 15 m, and/or in that the cover film (9) has a width of at least 10 cm, preferably between 10 cm to 2 m, more preferably between 0.4 to 1 m.

13. Sheet according to one of the aspects 1 to 12, characterized in that the sheet (1) has a length of at least 1 m, preferably between 2 to 1000 m, more preferably between 10 to 800 m.

14. Elongated sheet (1) for covering cultivated plants (2), with a basic film (3) of plastic, especially according to one of the preceding aspects,
wherein a ventilation area (5) extending in the longitudinal sheet direction (L) and having a plurality of ventilation openings (6) is provided in the central area (4) of the basic film (3),
wherein a plastic cover film (9) extending in the longitudinal sheet direction (L) of the basic film (3) is applied to the ventilation area (5), forming free spaces (11) for air exchange, and is firmly welded to the basic film (3) over a plurality of connection areas (10) following one another in the longitudinal sheet direction (L), and
wherein the sum of the areas of all ventilation openings (6) corresponds to at least 1%, preferably between 1.1% and 3%, of the total area of the basic film (3).

15. Use of a sheet (1) according to one of the preceding aspects in the agricultural sector, preferably for the covering of cultivated plants (2), preferably for protection against rain and/or weather conditions and/or for ventilation and/or aeration of the covered area.

16. Elongated sheet (1) for covering agricultural cultivated plants (2), with a basic film (3) of plastic,
wherein a ventilation area (5) extending in the longitudinal sheet direction (L) and having a plurality of ventilation openings (6) is provided in the central area (4) of the basic film (3),
wherein a cover film (9) of plastic extending in the longitudinal sheet direction (L) of the basic film (3) is applied to the ventilation area (5), forming free spaces (11) for air exchange, and is firmly welded to the basic film (3) over a plurality of connection areas (10) following one another in the longitudinal sheet direction (L), and
wherein the connection area (10) is designed to be inclined, at least in some areas, with respect to a weld start point (12) and a weld end point (13) with respect to the cross direction (Q) extending orthogonally to the longitudinal sheet direction (L).

17. Sheet according to aspect 16, characterized in that the line connecting the weld start point (12) to the weld end point (13) forms an angle to the cross direction (Q) of at least 5°, preferably between 5° and 70°, more preferably between 30° and 50° 18. Sheet according to aspect 16 or 17, characterized in that at least one connection area (10) comprises at least one preferably continuous welding (14) extending obliquely relative to the cross direction (Q) extending orthogonally to the longitudinal sheet direction (L).

19. Sheet according to one of aspects 16 to 18, characterized in that the weld start point (12) is connected to the weld end point (13) via the welding (14), or in that the weld start point (12) is provided on a first welding line (15) and the weld end point (13) is provided on a further welding line (16) spaced and/or shifted from the first welding line (15), in particular wherein both the first and the further welding line (15, 16) extend at least substantially in the cross direction (Q).

20. Sheet according to one of aspects 16 to 19, characterized in that the cover film (9) extends continuously in the longitudinal sheet direction (L) and/or over the entire length of the basic film (3), in particular wherein the cover film (9) is designed to completely cover the ventilation area (5).

21. Sheet according to one of aspects 16 to 20, characterized in that the ventilation area (5) comprises a plurality of neighbouring ventilation sections (17) arranged one behind the other in the longitudinal sheet direction (L), wherein at least one ventilation section (17) comprises at least one ventilation opening (6), in particular wherein in each case and/or at least one connection area (10) is arranged between neighbouring ventilation sections (17) and/or in particular wherein at least one ventilation section (17) is enclosed by at least two connection areas (10) and/or weldings (14).

22. Sheet according to one of aspects 16 to 21, characterized in that the ventilation area (5) comprises two ventilation segments (18) which, relative to the longitudinal sheet direction (L) of the sheet, are located opposite one another at least in some areas and are preferably designed mirror-symmetrically to one another, in particular wherein one ventilation segment (18) comprises a plurality of ventilation sections (17).

23. Sheet according to one of aspects 16 to 22, characterized in that the welding (14) and/or the first and/or further welding line (15, 16) extends over at least 10%, preferably between 20% to 90%, more preferably between 30% to 80%, of the width of a ventilation section (17) and/or the width of the ventilation area (5) and/or the width of the ventilation segment (18) and/or in that the welding (14) and/or the first and/or further welding line (15, 16) has a length of at least 10%, preferably between 20% and 90%, even more preferably between 30% and 80%, of the width of a ventilation section (17) and/or the width of the ventilation area (5) and/or the width of the ventilation segment (18).

24. Sheet according to one of aspects 16 to 23, characterized in that at least one, preferably all, welding(s) (14) and/or the first and/or further welding line(s) (15, 16) is/are designed at least in sections, preferably completely, straight or curved, especially in the shape of a curved section, in particular wherein directly neighbouring welds (14) form a V-shape at least in some areas.

25. Sheet according to one of aspects 16 to 24, characterized in that at least one connection area (10) comprises at least one further welding (20) extending at least substantially in cross direction (Q), in particular wherein a further welding (20) is arranged between two neighbouring ventilation sections (17) and/or in particular wherein the further welding (20) is/are at least substantially straight, and/or in particular wherein a Y-shaped formation of the connection area (10) is provided at least in regions by the further welding (20).

26. Sheet according to one of aspects 16 to 25, characterized in that the ventilation section (17) comprises a plurality of ventilation openings (6), preferably at least substantially identically formed, in particular between 2 to 30, preferably between 3 to 10, in particular wherein the ventilation openings (6) are arranged in rows preferably running parallel to the longitudinal sheet direction (L).

27. Sheet according to one of aspects 16 to 26, characterized in that the area of the ventilation section (17) belonging to the basic film (3) or the base area thereof occupied between neighbouring connection areas (10), preferably on both sides, tapers towards the separating line (19).

28. Sheet according to one of aspects 16 to 27, characterized in that the basic film (3) comprises a width of between 0.5 and 40 m, preferably between 1 and 20 m, more preferably between 1.5 and 15 m, and/or that the cover film (9) comprises a width of at least 10 cm, preferably between 10 cm and 2 m, even more preferably between 0.4 and 1 m.

29. Sheet according to one of aspects 16 to 28, characterized in that the sheet (1) comprises a length of at least 1 m, preferably between 2 to 1000 m, more preferably between 10 to 800 m.

30. Use of a sheet (1) according to one of the preceding aspects in the agricultural sector, preferably for covering cultivated plants (2), more preferably for protection against rain and/or weather influences and/or for aeration and/or ventilation of the covered area.

LIST OF REFERENCE SIGNS 1 sheet
2 cultivated plants
3 basic film
4 central area of 3
5 ventilation area
6 ventilation opening
7 longitudinal edge
8 further longitudinal edge
9 cover film
10 connection area
11 free space
12 weld start point
13 weld end point
14 welding
first welding line
16 further welding line
17 ventilation section
18 ventilation segment
19 separating line
20 further welding
21 longitudinal edge of 9
22 longitudinal edge of 9
23 intermediate ventilation channel
24 transition area
25 fastening means
26 opening
27 hooks
28 support means
29 corner
30 corner
31 further corner
32 border
33 foil tunnel
34 front side
35 framework
36 longitudinal side of 33
L longitudinal sheet direction
M centre point
Q cross direction

The invention claimed is:

1. An elongated sheet configured to cover agricultural crops and configured to generate a greenhouse climate in the covered area, comprising:
   an elongated basic film made of plastic, wherein a central area of the basic film includes a ventilation area extending in a longitudinal direction of the elongated sheet, the central area having a plurality of ventilation sections, each ventilation section including a plurality of ventilation openings, the central area further including a transition area, the transition area being free of weldings and free of ventilation openings, wherein a cover film comprising plastics material, which extends in the longitudinal direction of the basic film, and covers the plurality of ventilation sections, is applied to the ventilation area thereby forming free spaces for air exchange, the cover film welded to the basic film via a plurality of connection areas, one of the plurality of connection areas located between each of the plurality of ventilation sections, each connection area including a welding start point and a welding end point, wherein:

the cover film is a single layer, the material of the cover film is comprised such that the cover film, in a first state, lies one or more of flat against and on an upper side of the basic film in a region of the free spaces and, is configured through convection of heated air in the covered area to, in a second state, at least partially lift above the upper side of the basic film, wherein the first state is maintained up to a transition temperature $T_1$ of the greenhouse climate, and wherein the second state occurs from the transition temperature $T_1$ of the greenhouse climate, wherein the transition temperature $T_1$ is greater than 20° C., and the cover film is configured to be one or more of more elastic, softer, and less rigid than the basic film, and the cover film has a lower grammage than the basic film.

2. The sheet according to claim 1, wherein the connection area is straight or angled, orthogonal to the longitudinal direction, with respect to a weld start point and a weld end point.

3. The sheet according to claim 2, wherein a line connecting the weld start point to the weld end point forms an angle orthogonal to the longitudinal direction of at least 5°, and/or at least one connection area comprises at least one welding which extends obliquely, to the longitudinal direction.

4. The sheet according to claim 1, wherein the cover film and/or the basic film comprises or consists of one or more of polyethylene, and low-density polyethylene (LDPE).

5. The sheet according to claim 1, wherein the cover film comprises a same material as the basic film or a different material than the basic film.

6. The sheet according to claim 1, wherein the cover film and/or the basic film comprise an additive material of plastic, a polymer, ethylene-vinyl acetate copolymer (EVA), linear low density polyethylene (LLDPE), high density polyethylene (HDPE) and/or medium density polyethylene (MDPE).

7. The sheet according to claim 1, wherein one or more of the cover film and the basic film is a single layer, and/or
one or more of a texture and the layer structure of the basic film differs from the cover film, wherein the cover film has a smaller layer thickness than the basic film.

8. The sheet according to claim 1, wherein one or more of:
the cover film is a monoaxial or biaxial stretched film sheet,
the cover film comprises an embossing, and
the cover film comprises very low density polyethylene (VLDPE), ultra low density polyethylene (ULDPE), a plastomeric material and/or mixtures thereof.

9. The sheet according to claim 1, wherein one or more of:
the basic film has a width between 0.5 to 40 m, the cover film has a width of at least 10 cm, and
the sheet has a length of at least 1 m.

10. The sheet according to claim 1, wherein a distance between two connection areas directly adjacent to one another in the longitudinal direction is at least 5 cm.

11. The sheet according to claim 1, wherein one or more of:
the cover film has a layer thickness of at least 50 μm, and
the cover film comprises a grammage of at least 20 g/m².

12. The sheet according to claim 1, wherein one or more of:
the basic film has a layer thickness of at least 70 μm, and
the basic film comprises a grammage of at least 50 g/m².

13. The sheet according to claim 1, wherein the transition temperature $T_1$ is greater than 30° C.

14. The sheet according to claim 1, wherein at least one ventilation opening comprises a maximum diameter of at least 3 mm.

15. The sheet according to claim 1, wherein a sum of areas occupied by all ventilation openings corresponds to at least 1% of a total area of the basic film.

16. The sheet according to claim 1, wherein welds between the plurality of connection areas are Y shaped, in a direction orthogonal to the longitudinal direction.

17. The sheet according to claim 1, wherein a first weldment securing the cover film to the basic film is located on a first side of the central area between an approximate longitudinal centerline of the cover film and a first longitudinal edge of the cover film, and a second weldment also securing the cover film to the basic film is located on a second, opposite side of the central area between the approximate longitudinal centerline and a second, opposite, longitudinal edge of the cover film, the cover film configured to open along one or more portions of the first longitudinal edge and the second longitudinal edge.

* * * * *

UNITED STATES PATENT AND TRADEMARK OFFICE
CERTIFICATE OF CORRECTION

| | | |
|---|---|---|
| PATENT NO. | : 12,317,782 B2 | Page 1 of 1 |
| APPLICATION NO. | : 17/860510 | |
| DATED | : June 3, 2025 | |
| INVENTOR(S) | : Asterios Daios and Dimitrios Daios | |

It is certified that error appears in the above-identified patent and that said Letters Patent is hereby corrected as shown below:

On the Title Page

Item (72) "Inventors", Column 1, Line 7, please delete "Salonika" and insert -- Thessaloniki --, therefore.

Signed and Sealed this
First Day of July, 2025

Coke Morgan Stewart
*Acting Director of the United States Patent and Trademark Office*